(12) United States Patent
Tatum et al.

(10) Patent No.: US 7,706,692 B2
(45) Date of Patent: Apr. 27, 2010

(54) CONSUMER ELECTRONICS WITH OPTICAL COMMUNICATION INTERFACE

(75) Inventors: Jimmy A. Tatum, Plano, TX (US); James K. Guenter, Garland, TX (US)

(73) Assignee: Finisar Corporation, Sunnyvale, CA (US)

( * ) Notice: Subject to any disclaimer, the term of this patent is extended or adjusted under 35 U.S.C. 154(b) by 395 days.

(21) Appl. No.: 11/198,606

(22) Filed: Aug. 5, 2005

(65) Prior Publication Data

US 2006/0077778 A1  Apr. 13, 2006

Related U.S. Application Data

(60) Provisional application No. 60/614,199, filed on Sep. 29, 2004.

(51) Int. Cl.
*H04B 10/00* (2006.01)
(52) U.S. Cl. .................................. 398/139; 398/141
(58) Field of Classification Search ............. 398/141, 398/139
See application file for complete search history.

(56) References Cited

U.S. PATENT DOCUMENTS

| | | | |
|---|---|---|---|
| 3,663,822 A | | 5/1972 | Uchida |
| 3,792,284 A | * | 2/1974 | Kaelin ............................ 250/551 |
| 4,127,862 A | * | 11/1978 | Ilegems et al. .................. 257/184 |
| 4,427,879 A | | 1/1984 | Becher et al. |
| 4,595,839 A | * | 6/1986 | Braun et al. .................... 250/551 |
| 4,768,188 A | | 8/1988 | Barnhart et al. |
| 4,902,092 A | | 2/1990 | Grandy |
| 5,064,299 A | * | 11/1991 | Hirschmann et al. ........... 385/33 |
| 5,166,761 A | * | 11/1992 | Olson et al. .................... 257/46 |
| 5,337,398 A | | 8/1994 | Benzoni et al. |
| 5,341,086 A | * | 8/1994 | Fukudome .................... 323/273 |
| 5,448,661 A | * | 9/1995 | Takai et al. .................... 385/24 |

(Continued)

FOREIGN PATENT DOCUMENTS

JP        07-210644        8/1995

(Continued)

OTHER PUBLICATIONS

*Digital Visual Interface DVI Revision 1.0*, Digital Display Working Group. Apr. 2, 1999.

(Continued)

*Primary Examiner*—Agustin Bello
(74) *Attorney, Agent, or Firm*—Workman Nydegger

(57) ABSTRACT

Digital electronic devices for optical communication of digital video and/or audio signals between a digital source device and a digital sink device. A digital source device includes a transition minimized differential signaling (TMDS) transmitter for receiving control and digital video signals from a source controller and for converting the control and digital video signals into electric TMDS signals. An interface receives a first end of an optical fiber. An optical transmitter converts the electric TMDS signals to at least one optical signal and transmits the at least one optical signal to the first end of the optical fiber. A digital sink device receives the at least one optical signal from a second end of the optical fiber and converts the optical signal into TMDS signals. A TMDS receiver converts the TMDS signals into control and digital video signals and transmits the control and digital video signals to the sink controller.

15 Claims, 12 Drawing Sheets

U.S. PATENT DOCUMENTS

| | | |
|---|---|---|
| 5,451,767 A * | 9/1995 | Amano et al. ............ 250/214.1 |
| 5,497,187 A | 3/1996 | Banker et al. |
| 5,515,467 A | 5/1996 | Webb |
| 5,530,787 A | 6/1996 | Arnett |
| 5,631,988 A | 5/1997 | Swirhun et al. |
| 5,668,419 A | 9/1997 | Oktay |
| 5,732,176 A | 3/1998 | Savage, Jr. |
| 5,892,784 A * | 4/1999 | Tan et al. ................. 372/50.21 |
| 5,907,569 A * | 5/1999 | Glance et al. ........... 372/29.021 |
| 5,926,303 A | 7/1999 | Giebel et al. |
| 6,008,917 A * | 12/1999 | Moise et al. ................... 398/41 |
| 6,036,654 A | 3/2000 | Quinn et al. |
| 6,115,516 A | 9/2000 | Watson et al. |
| 6,179,627 B1 | 1/2001 | Daly et al. |
| 6,217,231 B1 | 4/2001 | Mesaki et al. |
| 6,220,873 B1 | 4/2001 | Samela et al. |
| 6,267,606 B1 | 7/2001 | Poplawski et al. |
| 6,446,867 B1 * | 9/2002 | Sanchez ..................... 235/454 |
| 6,458,619 B1 | 10/2002 | Irissou |
| 6,461,059 B2 | 10/2002 | Ando et al. |
| 6,478,625 B2 | 11/2002 | Tolmie et al. |
| 6,502,997 B1 | 1/2003 | Lee et al. |
| 6,515,308 B1 | 2/2003 | Kneissl et al. |
| 6,539,147 B1 | 3/2003 | Mahony |
| 6,540,412 B2 | 4/2003 | Yonemura et al. |
| 6,553,166 B1 * | 4/2003 | Caldwell ..................... 385/100 |
| 6,580,739 B1 * | 6/2003 | Coldren ................... 372/50.21 |
| 6,588,942 B1 | 7/2003 | Weld |
| 6,607,307 B2 | 8/2003 | Gilliland et al. |
| 6,717,972 B2 * | 4/2004 | Steinle et al. ............. 372/50.21 |
| 6,755,575 B2 | 6/2004 | Kronlund |
| 6,758,693 B2 | 7/2004 | Inagaki et al. |
| 6,774,348 B2 | 8/2004 | Tatum et al. |
| 6,793,539 B1 | 9/2004 | Lee et al. |
| 6,806,114 B1 * | 10/2004 | Lo ................................ 438/36 |
| 6,822,987 B2 * | 11/2004 | Diaz et al. ................ 372/38.02 |
| 6,905,257 B2 | 6/2005 | Eichenberger et al. |
| 6,914,637 B1 * | 7/2005 | Wolf et al. ................... 348/473 |
| 6,920,161 B2 * | 7/2005 | Riaziat et al. ................. 372/36 |
| 6,941,395 B1 | 9/2005 | Galang et al. |
| 6,952,395 B1 | 10/2005 | Manoharan et al. |
| 6,954,592 B2 * | 10/2005 | Tan et al. ..................... 398/138 |
| 6,965,722 B1 | 11/2005 | Nguyen |
| 7,062,171 B2 | 6/2006 | Ota et al. |
| 7,065,604 B2 * | 6/2006 | Konda et al. ................. 710/315 |
| 7,070,425 B2 | 7/2006 | Regen et al. |
| 7,088,518 B2 | 8/2006 | Tatum et al. |
| 7,153,039 B2 | 12/2006 | McGarvey et al. |
| 7,154,921 B2 * | 12/2006 | Kitamura et al. .............. 372/26 |
| 7,162,130 B2 | 1/2007 | Castellani et al. |
| 7,170,097 B2 * | 1/2007 | Edmond et al. ................. 257/77 |
| 7,179,329 B2 * | 2/2007 | Boone et al. ..................... 117/2 |
| 7,217,022 B2 | 5/2007 | Ruffin |
| 7,269,194 B2 * | 9/2007 | Diaz et al. ................ 372/38.02 |
| 7,269,673 B2 | 9/2007 | Kim et al. |
| 7,277,620 B2 | 10/2007 | Vongseng et al. |
| 7,294,868 B2 * | 11/2007 | Debray et al. ................ 257/104 |
| 7,373,069 B2 | 5/2008 | Lazo |
| 7,401,985 B2 | 7/2008 | Aronson et al. |
| 7,445,389 B2 | 11/2008 | Aronson |
| 2001/0035994 A1 | 11/2001 | Agazzi et al. |
| 2002/0018609 A1 | 2/2002 | Schumann |
| 2002/0044746 A1 | 4/2002 | Kronlund et al. |
| 2002/0049879 A1 * | 4/2002 | Eyer .......................... 710/305 |
| 2002/0063935 A1 | 5/2002 | Price et al. |
| 2002/0076157 A1 | 6/2002 | Kropp |
| 2002/0114590 A1 | 8/2002 | Eichenberger et al. |
| 2002/0136510 A1 | 9/2002 | Heinz et al. |
| 2002/0149821 A1 | 10/2002 | Aronson et al. |
| 2002/0159725 A1 | 10/2002 | Bucklen |
| 2002/0160656 A1 | 10/2002 | Nishita |
| 2002/0177362 A1 | 11/2002 | Chang |
| 2003/0016920 A1 | 1/2003 | Sohmura et al. |
| 2003/0021580 A1 | 1/2003 | Matthews |
| 2003/0034963 A1 * | 2/2003 | Moon et al. .................. 345/204 |
| 2003/0208779 A1 * | 11/2003 | Green et al. ................. 725/143 |
| 2003/0223756 A1 | 12/2003 | Tatum et al. |
| 2004/0008996 A1 | 1/2004 | Aronson et al. |
| 2004/0076119 A1 | 4/2004 | Aronson et al. |
| 2004/0141695 A1 | 7/2004 | Miller et al. |
| 2004/0184746 A1 * | 9/2004 | Chang et al. ................. 385/100 |
| 2004/0208600 A1 | 10/2004 | Guenter et al. |
| 2004/0252560 A1 | 12/2004 | Hsieh |
| 2004/0263941 A1 | 12/2004 | Chen et al. |
| 2005/0036746 A1 | 2/2005 | Scheibenreif et al. |
| 2005/0053340 A1 | 3/2005 | Toriumi et al. |
| 2005/0063440 A1 * | 3/2005 | Deppe .......................... 372/50 |
| 2005/0063707 A1 * | 3/2005 | Imai ........................... 398/141 |
| 2005/0063711 A1 | 3/2005 | Rossi et al. |
| 2005/0078916 A1 | 4/2005 | Hosking |
| 2005/0105910 A1 | 5/2005 | Light |
| 2005/0105913 A1 | 5/2005 | Ozeki et al. |
| 2005/0105915 A1 | 5/2005 | Light |
| 2005/0180700 A1 * | 8/2005 | Farr ............................ 385/89 |
| 2005/0238358 A1 | 10/2005 | Light |
| 2005/0249477 A1 | 11/2005 | Parrish |
| 2005/0286593 A1 | 12/2005 | Guenter |
| 2005/0286893 A1 | 12/2005 | Horiuchi et al. |
| 2006/0008276 A1 * | 1/2006 | Sakai et al. .................. 398/141 |
| 2006/0036788 A1 | 2/2006 | Galang et al. |
| 2006/0045425 A1 | 3/2006 | Kanie et al. |
| 2006/0045437 A1 | 3/2006 | Tatum et al. |
| 2006/0045526 A1 | 3/2006 | Katayama et al. |
| 2006/0049936 A1 | 3/2006 | Collins et al. |
| 2006/0067690 A1 * | 3/2006 | Tatum et al. .................... 398/66 |
| 2006/0077778 A1 * | 4/2006 | Tatum et al. .............. 369/44.11 |
| 2006/0083518 A1 * | 4/2006 | Lee et al. ...................... 398/155 |
| 2006/0088251 A1 * | 4/2006 | Wang et al. .................... 385/88 |
| 2006/0093280 A1 | 5/2006 | McColloch |
| 2006/0142744 A1 | 6/2006 | Boutoussov |
| 2007/0058976 A1 * | 3/2007 | Tatum et al. .................. 398/99 |
| 2007/0233906 A1 * | 10/2007 | Tatum et al. ................... 710/26 |

FOREIGN PATENT DOCUMENTS

| | | |
|---|---|---|
| JP | 08-008818 | 1/1996 |
| JP | 08130508 | 5/1996 |
| JP | 09-162811 | 6/1997 |
| JP | 2000241642 | 9/2000 |
| JP | 2002208896 | 7/2002 |
| JP | 2002-366340 | 12/2002 |
| JP | 2003-163639 | 6/2003 |
| JP | 2003249711 | 9/2003 |
| JP | 2003-332667 | 11/2003 |
| JP | WO2004054139 | 6/2004 |
| JP | 2004200847 | 7/2004 |
| JP | 2004213949 | 7/2004 |
| JP | 2004241361 | 7/2004 |
| WO | WO03063309 | 7/2003 |
| WO | 2004054139 | 6/2004 |

OTHER PUBLICATIONS

*High-Definition Multimedia Interface Specification Version 1.1*, HDMI Licensing, LLC. May 20, 2004.
*High-Definition Multimedia Interface Specification Version 1.2*, HDMI Licensing, LLC. Aug. 22, 2005.
"Fiber Optic Infrastructure," © 2000 by Extreme Networks, Inc.
"Optical DVI—HDCP Extension Cable," by Opticis, dated Aug. 27, 2003.
Caruso, Jeff; "Bandwidth Boom: Making The Connection, Can Fiber Break Through the Glass Ceiling?" Jul. 13, 1998 [retrieved on Apr. 25, 2005]. (Web page; 3 pages). http://www..internetweek.com/supp/bandwidth/canfiber.htm.

Opticis; "Optical DVI Extension Module" © 2005 [retrieved on Apr. 25, 2005]. (Web page; 2 pages). http://www.opticis.com/products_2.htm.

Kanellos, Michael; "Intel Gets Optical Wth Fibre" Mar. 1, 2004 [retrieved on Apr. 26, 2005]. (Web page; 2 pages). http://news.zdnet.co.uk/0,39020330,39147918,00.htm.

Kanellos, Michael; "Intel Connects Chips With Optical Fiber" Feb. 27, 2004 [retrieved on Apr. 26, 2005]. (Web page; 5 pages). http://news.zdnet.com/2100-9574_22-5166883.html.

"Sandia Develops Vertical Cavity Surface Emitting Laser that Promises to Reduce Cost of Fiber Optics Connections," Sandia National Laboratories, Jun. 6, 2000, (Web page; 3 pages). http://www.sandia.gove/media/NewsRel/NR2000/laser.htm.

"Full-Scale Entry of Optical Transmission System Business Begins as Fujifilm Introduces Optical DVI Link System That Utilizes Lumistar, A Graded Index Plastic Optical Fiber—Realizes World's First 30M-Class High-speed Optical Linking of Digital Images Using a Plastic Optical Fiber"; Sep. 8, 2004, (Web Page; 3 pages). http://www.fujifilm.com/news/n040908.html (3 pages).

"Optical DVI (Digital Visual Interface) Link System" (Picture Image, 1 page). First date of publication unknown.

"DVI Extender Extend a single link digital DVI display up to 4,950 feet (1,500 meters). Also known as: DVI Optical Extension, DVI-D extender, DVI digital to multimode fiber, optical extender, graphic extension modules, fiber optic digital video extender"; (Web Page; 2 pages). Date of first publication unknown. http://www.networktechinc.com/dvi-optical-extender.html.

"DVI and HDMI extension, CAT5 and Fiber Optic Perfect Extenders for your Projector, Plasma, LCD screen or HDTV"; (Web Page; 6 pages). Date of first publication unknown. http://www.ramelectronics.net/html/DVI_fiber_cables.html.

Inova Semiconductors, Application Note, GigaStar Digital Display Link, Interfacing Between GigaSTaR DDL and DVI/LVDS, Revision 1.0, 10 pages.

U.S. Appl. No. 11/402,106, filed Apr. 10, 2006; Active Optical Cable With Electrical Connector; Lewis B. Aronson et al.

U.S. Appl. No. 11/402,186, filed Apr. 10, 2006; Active Optical Cable Electrical Connector; Lewis B. Aronson et al.

U.S. Appl. No. 11/402,241, filed Apr. 10, 2006; Active Optical Cable Electrical Adaptor; Lewis B. Aronson et al.

U.S. Appl. No. 11/402,161, filed Apr. 10, 2006 Electrical-Optical Active Optical Cable; Lewis B. Aronson et al.

U.S. Appl. No. 11/401,802, filed Apr. 10, 2006; Active Optical Cable With Integrated Power; Lewis B. Aronson et al.

U.S. Appl. No. 11/402,169, filed Apr. 10, 2006; Active Optical Cable With Integrated Retiming; Lewis B. Aronson et al.

U.S. Appl. No. 11/401,803, filed Apr. 10, 2006; Active Optical Cable With Integrated Eye Safety; Lewis B. Aronson.

U.S. Appl. No. 11/468,280, filed Aug. 28, 2006; Optical Networks for Consumer Electronics; Jimmy A. Tatum et al.

U.S. Appl. No. 11/470,623, filed Sep. 6, 2006; Laser Drivers for Closed Path Optical Cables; Jim A. Tatum et al.

Steve Joiner, Open Fiber Control for Parallel Optics, Communication Semiconductor Solutions Division, May 27, 1997, 13, USA.

U.S. Appl. No. 10/829,609, filed Apr. 22, 2004 entitled "Compact Optical Transceivers."

U.S. Appl. No. 11/009,208, mail date Oct. 26, 2007, Notice of Allowance.

U.S. Appl. No. 11/009,208, mail date Oct. 1, 2007, Office Action.

U.S. Appl. No. 11/009,208, mail date Apr. 3, 2007, Final Office Action.

U.S. Appl. No. 11/009,208, mail date Jul. 26, 2006, Office Action.

U.S. Appl. No. 11/009,208, mail date Feb. 14, 2006, Office Action.

U.S. Appl. No. 11/198,619, mail date Dec. 17, 2008, Office Action.

U.S. Appl. No. 11/198,619, mail date Apr. 18, 2008, Final Office Action.

U.S. Appl. No. 11/198,619, mail date Nov. 16, 2007, Office Action.

U.S. Appl. No. 11/198,619, mail date May 4, 2007, Final Office Action.

U.S. Appl. No. 11/198,619, mail date Oct. 11, 2006, Office Action.

U.S. Appl. No. 11/468,280, mail date Oct. 20, 2008, Office Action.

U.S. Appl. No. 11/468,280, mail date Jul. 28, 2008, Office Action.

U.S. Appl. No. 11/468,280, mail date Mar. 20, 2008, Final Office Action.

U.S. Appl. No. 11/468,280, mail date Sep. 11, 2007, Office Action.

U.S. Appl. No. 11/402,106, mail date Oct. 20, 2008, Notice of Allowance.

U.S. Appl. No. 11/402,106, mail date Apr. 29, 2008, Office Action.

U.S. Appl. No. 11/402,106, mail date Dec. 28, 2007, Final Office Action.

U.S. Appl. No. 11/402,106, mail date May 7, 2007, Final Office Action.

U.S. Appl. No. 11/402,106, mail date Sep. 21, 2006, Office Action.

U.S. Appl. No. 11/402,186, mail date Jul. 3, 2007, Final Office Action.

U.S. Appl. No. 11/402,186, mail date Oct. 10, 2006, Office Action.

U.S. Appl. No. 11/470,623, mail date Sep. 9, 2008, Final Office Action.

U.S. Appl. No. 11/470,623, mail date Feb. 19, 2008, Office Action.

U.S. Appl. No. 11/401,803, mail date Jun. 30, 2008, Notice of Allowance.

U.S. Appl. No. 11/401,803, mail date Aug. 24, 2007, Office Action.

U.S. Appl. No. 11/401,803, mail date Jul. 11, 2007, Office Action.

U.S. Appl. No. 11/401,802, mail date Mar. 20, 2008, Final Office Action.

U.S. Appl. No. 11/401,802, mail date Apr. 17, 2007, Office Action.

U.S. Appl. No. 11/402,241, mail date Mar. 25, 2008, Office Action.

U.S. Appl. No. 11/402,241, mail date Apr. 17, 2007, Office Action.

U.S. Appl. No. 11/402,169, mail date Feb. 21, 2008, Final Office Action.

U.S. Appl. No. 11/402,169, mail date Jun. 29, 2007, Office Action.

U.S. Appl. No. 11/402,161, mail date Mar. 14, 2008, Notice of Allowance.

U.S. Appl. No. 11/402,161, mail date Sep. 11, 2007, Office Action.

U.S. Appl. No. 11/402,161, mail date May 31, 2007, Office Action.

* cited by examiner

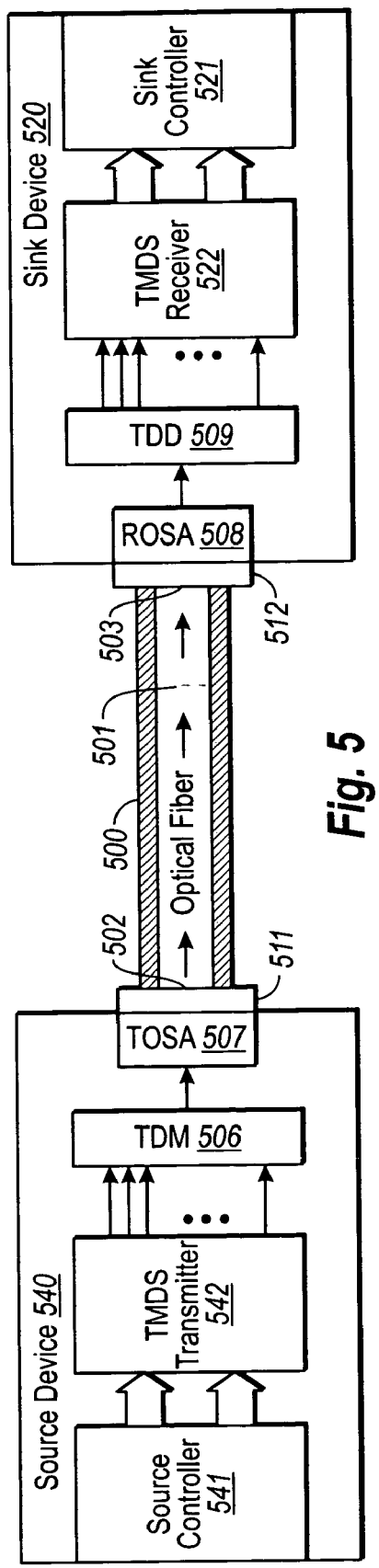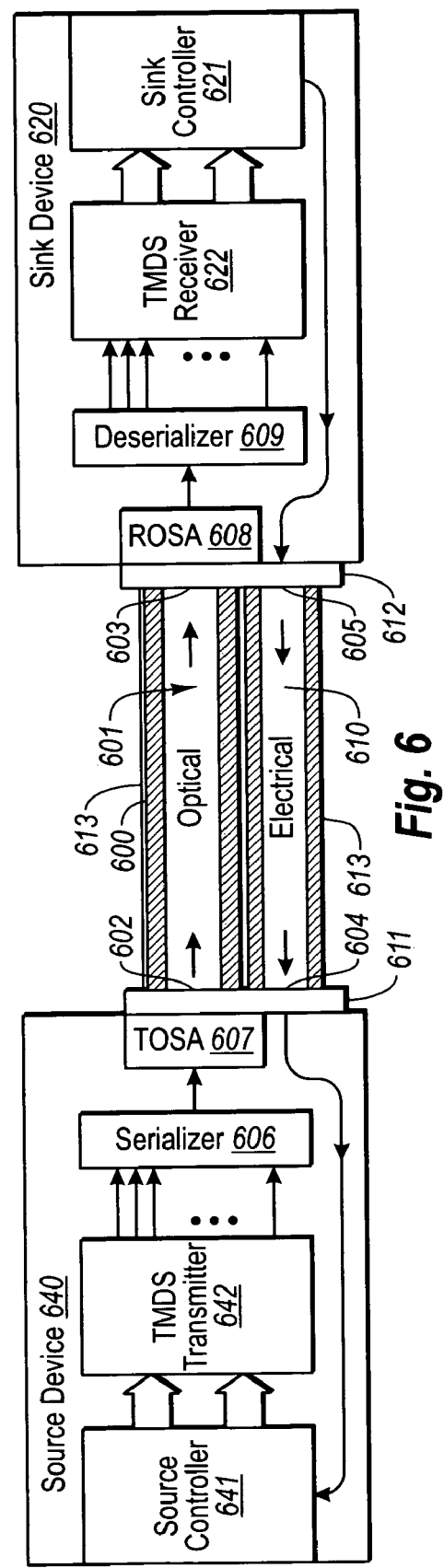

CONSUMER ELECTRONICS WITH OPTICAL COMMUNICATION INTERFACE

CROSS-REFERENCE TO RELATED APPLICATIONS

This application relates to U.S. Provisional Patent Application No. 60/614,199 entitled "OPTICAL DVI CABLES" filed Sep. 29, 2004, the contents of this application are hereby expressly incorporated by reference herein. This application is also related to U.S. patent application Ser. No. 10/316,355 entitled "OPTICAL TRANSCEIVER" filed Dec. 11, 2002, which is a CIP of U.S. patent application Ser. No. 10/163,057, filed Jun. 4, 2002, entitled "OPTICAL TRANSCEIVER", the contents of both applications are hereby expressly incorporated by reference herein. This application is also related to U.S. patent application Ser. No. 10/308,308, entitled "BIDIRECTIONAL OPTICAL DEVICE" filed Dec. 3, 2002, the contents of this application are hereby expressly incorporated by reference herein. This application is also related to U.S. patent application Ser. No. 10/877,915 entitled "LIGHT EMITTING DEVICE WITH AN INTEGRATED MONITOR PHOTODIODE" filed Jun. 25, 2004, the contents of this application are hereby expressly incorporated by reference herein. This application is also related to U.S. patent application Ser. No. 11/082,521 entitled "LASER PACKAGE WITH DIGITAL ELECTRONIC INTERFACE" filed Mar. 17, 2005, which claims the benefit of U.S. Provisional Application Ser. No. 60/605,781, entitled "LASER WITH DIGITAL ELECTRONIC INTERFACE" filed Aug. 31, 2004, the contents of these applications are hereby expressly incorporated by reference herein. This application is also related to U.S. patent application Ser. No. 10/163,440, entitled "METHOD AND APPARATUS FOR MONITORING THE POWER OF A MULTI-WAVELENGTH OPTICAL SIGNAL" filed Aug. 10, 2004, the contents of this application are hereby expressly incorporated by reference herein.

BACKGROUND OF THE INVENTION

1. The Field of the Invention

The present invention relates generally to data transmission between electronic devices. More specifically, the present invention relates to interfaces for optical communication of digital video and/or audio data between digital consumer electronic devices.

2. The Relevant Technology

Digital consumer electronics, such as digital video displays, digital video disk (DVD) readers, flat screen computer monitors, high definition televisions ("HDTV"), digital plasma screens, digital audio readers, digital audio encoders and readers, digital audio amplifiers, and digital audio processing devices have become of increased popularity. As the amount of data transferred between digital components expands to accommodate the desire for greater resolution, size, and quality, the need for high speed data transfer of digital data also increases. Several standards supporting data transfer to digital consumer electronic devices have been developed, but many have not adequately addressed the high bandwidth and high resolution needs of emerging products. In addition, many of these standards exhibit several other inherent limitations. For example, two current standards implemented for transmission of digital video and/or digital audio data include the digital video interface (DVI) standard and the high definition multimedia interface (HDMI) standard. Both the HDMI standard and the DVI standard are based on transmission minimized differential signaling (TMDS), Silicon Image's high-speed, serial link technology.

DVI Technology

DVI is a display interface developed by the Digital Display Working Group ("DDWG"). The DVI specification can provide a high-speed digital connection between DVI digital source devices (e.g. DVI digital video processing devices) and DVI digital sink devices (e.g. DVI digital video display devices). One common implementation of DVI is as an interface for a computer having a video controller card and a digital display device (CRT, LCD, projector, etc) having a display controller. The DVI interface standard and description are contained within the publication entitled *Digital Visual Interface*, Revision 1.0, published by the Digital Display Working Group on Apr. 2, 1999, the contents of which are hereby expressly incorporated by reference herein.

DVI utilizes a high-speed serial interface and TMDS to send data to the DVI sink device (e.g. a display device). TMDS conveys data by transitioning between "on" and "off" states. An encoding algorithm uses Boolean exclusive OR ("XOR") or exclusive NOR ("XNOR") operations applied to minimize the transitions to avoid excessive electromagnetic interference ("EMI") levels in the DVI cable. An additional operation is performed to balance the DC signal.

The digital DVI connector has 24 pins that can accommodate up to two TMDS links. The basic TMDS transmission line is made up of three data channels and a clock channel. Data comprises 8 bit pixels in each of three channels (R/G/B). In some instances, a pair of TMDS lines may be used to achieve higher data rates. In addition to the TMDS data channels and clock channels, the digital interface includes a 5 VDC power source, and a hot plug detect channel. The DVI-I combined digital and analog pin assignments are similar to the DVI-D digital only interface pin assignments, but further includes several pins for transmission of an analog signal.

FIG. 1 illustrates a typical flow of data from a graphics controller 120 of a DVI source device 125, such as a digital video processing device, through the TMDS links 130 and to the display controller 135 of a DVI sink device 140, such as a digital video display device. In this process, incoming 8-bit data is encoded into 10-bit transition-minimized, DC-balanced characters. The first eight bits are encoded data, and the ninth bit identifies whether the data was encoded with XOR or XNOR logic; the tenth bit is used for DC balancing.

Due to several properties of the DVI interface, DVI cables having copper electrical cables may be limited to a length of about 3-5 meters. This limited length reduces the number of potential applications that can utilize DVI cables. For example, the length limits remote placement of digital sink devices.

Typical DVI cables having copper electrical links are also limited in bandwidth and data transfer rates. DVI data rates typically range from 22.5 mega pixels per second (Mpps) to 165 Mpps (up to 1.65 Giga bits). Because TMDS conveys data by transitioning between "on" and "off" states, electromagnetic interference ("EMI") levels in the DVI cable can limit the speed at which data may be transferred in addition to the length of the cable.

Further, although DVI is a standard interface, some digital video processors and digital video displays may be incompatible or incapable of interoperation with one another. Thus, at least in some environments, bidirectional communication for reconfiguring a digital video processor and/or digital video display would be desirable. Unfortunately, configuration data is typically not transmitted. Further, many DVI interfaces lack sufficient connectivity to transmit data (e.g.

configuration data) from the digital video display to the digital video processor. As a result, a DVI source device and a DVI sink device can remain incompatible.

HDMI Technology

HDMI is backward compatible with PCs, displays, and consumer electronics devices incorporating the DVI standard. HDMI is also based on the TMDS serial link technology. HDMI technology supports standard, enhanced, or high-definition video, plus multi-channel digital audio on a single cable. It transmits ATSC HDTV standards and supports 8-channel digital audio with 5 giga bytes per second (Gbps) of bandwidth. The HDMI technology, functionality, and hardware is disclosed in the "High-Definition Multimedia Interface" specification Version 1.1, May 20, 2004, by HDMI Licensing, LLC, the contents of which are hereby expressly incorporated by reference in its entirety herein.

The HDMI standard can be used for transmitting digital television audiovisual signals from DVD players, set-top boxes and other audiovisual source devices to HDMI sink devices, such as television sets, projectors and other audiovisual devices. HDMI can carry multi-channel audio data and can carry standard and high definition consumer electronics video formats. Content protection technology is also available. HDMI can also carry control and status information in both directions.

Referring to FIG. 2, an HDMI block diagram is shown where a standard HDMI cable includes four differential pairs 201-204 that make up the TMDS data and clock channels, referred to collectively as HDMI TMDS links 200. These HDMI TMDS links 200 are used to carry video, audio and auxiliary data. In addition, HDMI carries a VESA DDC channel 205. The DDC channel 205 is used for configuration and status exchange between a HDMI source 210 and a HDMI sink 215. The optional CEC protocol line 220 provides high-level control functions between all of the various audiovisual products in a user's environment.

Audio, video and auxiliary data is transmitted across the three TMDS data channels 201-203. Video pixel clock data is transmitted on the TMDS clock channel 204 and is used by an HDMI receiver 230 as a frequency reference for data recovery on the three TMDS data channels 201-203. Video data is carried as a series of 24-bit pixels on the three TMDS data channels 201-203. TMDS encoding converts the 8 bits per channel into a 10 bit DC-balanced, transition minimized sequence which is then transmitted serially across the HDMI TMDS data channels 201-203 at a rate of 10 bits per pixel clock period. Video pixel rates can range from 25 MHz to 165 MHz. The video pixels can be encoded in either RGB, YCBCR 4:4:4 or YCBCR 4:2:2 formats.

In order to transmit audio and auxiliary data across the TMDS links 200, HDMI uses a packet structure. To attain higher reliability of audio and control data, this data is protected with an error correction code and is encoded using a special error reduction coding to produce the 10-bit word that is transmitted. Optionally, HDMI can carry a single such stream at sample rates up to 192 KHz or from two to four such streams (3 to 8 audio channels) at sample rates up to 96 KHz. HDMI can also carry compressed (e.g. surround-sound) streams. The DDC channel 205 is used by the HDMI source device 210 to read the HDMI sink device's 215 Enhanced Extended Display Identification Data (E-EDID) to discover the sink device's 215 configuration and/or capabilities. The HDMI source device 210 reads the sink device's 215 E-EDID and delivers only the audio and video formats that are supported by the sink device 215. In addition, the HDMI sink device 215 can detect InfoFrames and process the received audio and video data appropriately.

A digital consumer device's external HDMI connection is embodied by two specified HDMI connectors, Type A or Type B. These connectors can be attached directly to the device or can be attached via a cable adapter that is shipped with the device. The Type A connector carries all required HDMI signals, including a single TMDS link. The Type B connector is slightly larger and carries a second TMDS link, which is necessary to support very high-resolution computer displays requiring dual link bandwidth. A passive cable adapter between Type A and Type B connectors is specified.

The CEC protocol line 220 is optionally used for higher-level user functions such as automatic setup tasks or tasks typically associated with infrared remote control usage. The Type A connector carries only a single TMDS link and is therefore only permitted to carry signals up to 165 Mpps. To support signals greater than 165 Mpps, the dual-link capability of the Type B connector is used.

The input stream to the HDMI source's transmitter 235 from the HDMI source's controller 240 will contain video pixel, packet and control data. The packet data can include audio and auxiliary data and associated error correction codes. These data items are processed in a variety of ways and are presented to the HDMI source's 210 transmitter 235 as either 2 bits of control data, 4 bits of packet data or 8 bits of video data per TMDS channel. The HDMI source controller 240 encodes one of these data types or encodes a Guard Band character on any given clock cycle. The stream of TMDS characters produced by the transmitter 235 is serialized for transmission on the TMDS data channels 201-203.

These current cables and solutions, as well as others, are limited in many ways in their capabilities to carry digital video and/or digital audio signals. For example, these cables are limited in bandwidth and distance in which they can carry TMDS signals. One solution to the problem of limited length of these cables is a repeater, which is a device with a retransmission function for extension or distribution of digital video and/or audio signals from cables such as DVI and HDMI cables. The circuitry of a repeater can retrieve, equalize, amplify, and re-transmit the digital video and/or digital audio signals into another length of cable. A repeater may be capable of transmitting digital video and/or audio signals to about 25 or 35 meters in some instances. However, a repeater can be quite expensive, add additional hardware and circuitry, require additional cables for the extension, and even still be limited in distances to which the repeater can retransmit digital video and/or audio signals and limited in the bandwidth of the cables. Therefore, repeaters have not provided a desired solution to many of the problems currently experienced with these cables, but rather tried to mitigate the limitations of such cables.

Thus, for these reasons, as well as others, there is still a need to improve digital video and/or audio cables, for example, by providing cables with improved transfer rates, increase cable lengths, and/or providing for bidirectional communication for system configuration between digital electronic components.

SUMMARY OF THE INVENTION

The present invention relates to digital electronic components with an optical interface. A digital source device can include a source controller. The digital source device can also include a transition minimized differential signaling (TMDS) transmitter coupled to the source controller for receiving control and digital video signals from the source controller and for converting the control and digital video signals into electric TMDS signals. The digital source device can also include an interface configured to receive a first end of an optical fiber. The digital source device can also include an optical transmitter for receiving the electronic TMDS signals, converting the electric TMDS signals to at least one optical signal, and for transmitting the at least one optical signal to the optical fiber.

A digital sink device can include a sink controller. The digital sink device can also include an interface configured to receive a first end of an optical fiber. The digital sink device can also include an optical receiver for receiving an optical signal from the first end of the optical fiber and for converting the optical signal into at least one TMDS signal. The digital sink device can also include a TMDS receiver coupled to the sink controller for receiving the TMDS signals and for converting the TMDS signals into control and digital video signals and for to transmitting the control and digital video signals to the sink controller.

A method for communication between a digital source device and a digital sink device can include receiving electrical TMDS signals from a TMDS transmitter within the digital source device. The method can also include converting the TMDS signals into at least one optical signal within the digital source device. The method can also include transmitting the at least one optical signal to a first end of an optical fiber coupled to an interface of the digital source device. The method can also include receiving the optical signals from a second end of the optical fiber by an interface of the digital sink device coupled to the second end of the optical fiber. The method can also include converting the at least one optical signal into electrical TMDS signals within the digital sink device. The method can also include transmitting the electrical TDMS signals to a sink controller.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5 illustrates digital electronic devices according to an example embodiment of the present invention;

FIG. 6 illustrates digital electronic devices according to an example embodiment of the present invention;

DETAILED DESCRIPTION OF THE PREFERRED EMBODIMENTS

The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention. Well known devices and processes have been excluded so as not to obscure the invention in detail.

Figure 3:
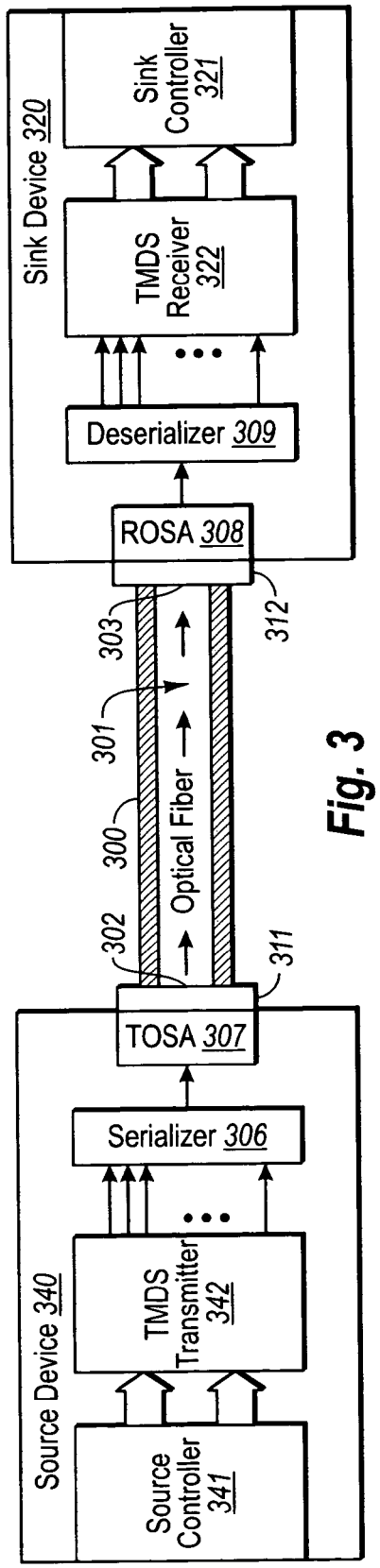
FIG. 3 illustrates digital electronic devices according to an example embodiment of the present invention.

Referring to FIG. 3, a digital source device 340 and a digital sink device 320 are shown according to one example embodiment of the present invention. An optical cable 300 can comprise an optical fiber 301 having a first end 302 and a second end 303. The digital source device 340 is coupled to the first end 302 of the optical fiber 301 by a first interface 311, and the digital sink device 320 is coupled to the second end 303 of the optical fiber 301 by a second interface 312.

The digital source device 340 includes a source controller 341 and a TMDS transmitter 342. The digital source device 340 can include a serializer 306, such as an electronic serializer circuit, and a transmit optical subassembly ("TOSA") 307. The serializer 306 may be an electrical serializer circuit that receives the electrical TMDS signals (the number of TMDS signals will depend on the particular standard) from the TMDS transmitter 342 and serializes the TMDS signals into a single electrical signal. The TOSA 307 can include an optical transmitter, such as a light emitting diode ("LED") or a laser diode (e.g. a VCSEL), that receives the electrical serialized data signal from the serializer 306 and converts the electrical serialized data signal into an optical serialized data signal for transmission onto the optical fiber 301.

The digital sink device 320 includes a TMDS receiver 322 and a sink controller 321. The digital sink device further includes a receive optical subassembly ("ROSA") 308 and a deserializer 309, such as an electronic deserializer circuit. The ROSA 308 can include an optical receiver, such as a photodiode, that receives the optical serialized data signal from the optical fiber 301 and converts the optical serialized data signal to an electrical serialized data signal. The deserializer 309 may be an electrical deserializer circuit that receives the electrical serialized data signal from the ROSA 308 and deserializes the electrical serialized data signal into TMDS signals (the number of TMDS signals will depend on the particular standard) for transmission to the TMDS receiver 322 of the digital sink device 320.

To display a digital video image or play digital audio on the digital sink device 320, the source controller 341 of the digital source device 340 transmits data signals, such as pixel data, audio data, and/or control data, to the TMDS transmitter which converts the data signals into the TMDS data signal format for a particular standard (e.g. DVI, HDMI, etc.). The TMDS transmitter 342 transmits the TMDS-data signals to the serializer 306. The serializer 306 receives the TMDS signals and serializes the TMDS signals into a single electrical serialized data signal. The serializer 306 transmits the electrical serialized data signal to the TOSA 307. The TOSA 307 converts the electrical serialized data signal to an optical serialized data signal and transmits the optical serialized data signal to the optical fiber 301.

The optical serialized data signal is received by the ROSA 308 of the digital sink device 320, and the ROSA 308 converts the optical serialized data signal back to an electrical serialized data signal. The ROSA 308 transmits the electrical serialized data signal to a deserializer 309, which deserializes the electrical serialized data signal back into several TMDS signals depending on the standard used by the digital sink device 320 (e.g. DVI, HDMI, etc.). The deserializer 309 transmits the TMDS signals to a TMDS receiver 322. The TMDS receiver 322 converts the TMDS signals to video and/or audio data signals, such as pixel data, audio data, and/or control data, and the signals are output to the sink controller 321 of the digital sink device 320.

Figure 4:
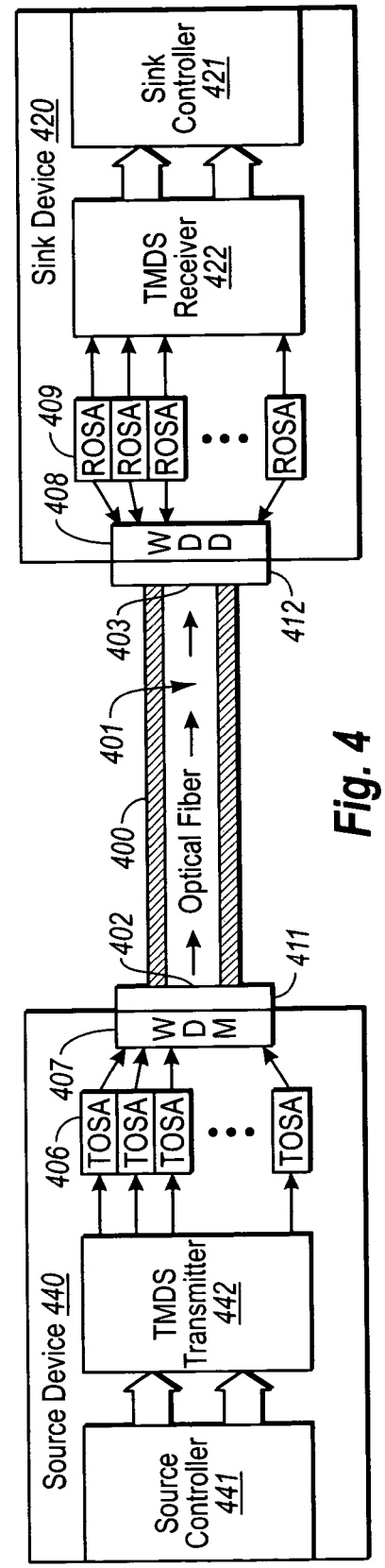
FIG. 4 illustrates digital electronic devices according to an example embodiment of the present invention.

Referring now to FIG. 4, a digital source device 440 and a digital sink device 420 are shown according to another example embodiment of the present invention. According to the embodiment shown in FIG. 4, the digital source device 440 can include a plurality of TOSAs 406 (or other optical transmit chips) and a wavelength-division multiplexer (WDM) 407. Wavelength-division multiplexing combines beams of light from different wavelengths into a single optical transmission to be received by an optical fiber 401 coupled to the digital source device 440. A digital sink device 420 includes a wavelength-division demultiplexer ("WDD") 408 and a plurality of ROSAs 409 (or other optical receiver chips). The WDD 408 separates a multiplexed beam into separate beams of light of different wavelengths In operation, the source controller 441 produces data signals, such pixel data, audio data, and/or control data. The data signals are transmitted to the TMDS transmitter 442, which converts the data signals into the TMDS data signal format conforming to the applicable standard (e.g. DVI, HDMI, etc.). The TMDS transmitter 442 transmits the TMDS data signals to the plurality of TOSAs 406, one TOSA receiving each TMDS data signal. The TOSAs 406 each include an optical transmitter, such as a laser or LED. Each optical transmitter transmitting light at a shifted wavelength from the other optical transmitters. The TOSAs 406 convert the electrical TMDS signals to optical equivalents of the TMDS signals and transmit the optical TMDS signals to the WDM 407. The WDM 407 receives the optical TMDS signals and combines the optical TMDS signals from the different transmitters (each at a different wavelength) into a multiplexed optical signal, and transmits the multiplexed optical signal onto a first end 402 of an optical fiber 401 of an optical cable 400 received by an interface 411 of the electronic source device 440.

The multiplexed optical signal is received by the WDD 408 from a second end 403 of the optical fiber 401 received by a second interface 412 of the optical sink device 420. The WDD 408 separates the individual wavelengths received, and guides the separate optical signals to the appropriate one of the ROSAs 409. Each of the ROSAs 409 includes an optical receiver that converts the optical signals back to an electrical TMDS signal. The ROSAs 409 transmit the electrical TMDS signals to a TMDS receiver 422. The TMDS receiver 422 converts the TMDS signals to video display and/or audio data signals, such as pixel data, audio data, and control data, and the data is output to a display and/or audio controller 421 of the digital sink device 420.

Referring now to FIG. 5, a digital source device 540 and a digital sink device 520 are coupled together by an optical cable 500. According to the embodiment shown in FIG. 5, the digital source device 540 and the digital sink device 520 use time-division multiplexing to transmit the TMDS signals across an optical fiber 501 having a first end 502 and a second end 503, which are received by a first interface 511 and a second interface 512 respectively.

Time-division multiplexing is digital multiplexing in which two or more apparently simultaneous channels are derived from a single optical spectrum by interleaving pulses. Therefore each channel is allocated access to the optical transmission link in sequential intervals. For example, a similar method is a packet switched transmission system which may be particularly advantageous in an HDMI device. The digital source device 504 includes a time division multiplexer 506 and a TOSA 507 for communicating with the digital sink device 520, which includes a ROSA 508 and a time division demultiplexer (TDD) 509.

In operation, the source controller 541 of the digital source device 540 produces data signals (e.g. pixel, audio, and/or control data signals). The data signals are transmitted to the TMDS transmitter 542, which converts the data signals into the TMDS data signal format. The TMDS transmitter 542 transmits the TMDS data signals to the TDM 506. The TDM 506 receives the TMDS signals and interleaves the signals for sequential transmission to the TOSA 507. The TOSA 507 receives the interleaved signals, converts the electrical signals transmitted from the TDM 507 into optical signals, and transmits the optical signals to the optical fiber 501 coupled to a first interface 502 of the digital source device 540.

The optical signals are received by the ROSA 508 coupled to a second interface 512 of the optical cable 600. The ROSA 508 includes an optical receiver that converts the optical signals back to electrical signals and transmits the electrical signals to the TDD 509. The TDD 509 separates the electrical signal into TMDS signals (e.g. based on an imbedded field in a packet of data), and transmits the separate TMDS signals to the TMDS receiver 522. The TMDS receiver 522 converts the TMDS signals into video and/or audio data signals, and the video and/or audio data signals are output to the display and/or audio controller 521 of the digital sink device 520 along with control signals.

Referring now to FIG. 6, a digital source device 640 and a digital sink device 620 are coupled together for bidirectional communication by a bidirectional electro-optical cable 600 according to an example embodiment of the present invention. The cable 600 comprises an optical fiber 601 having a first end 602 and a second end 603, and an electrical link (e.g. a metal wire or cable) 610 having a first end 604 and second end 605. Both the optical fiber 601 and the electric link 610 can be encased by a plastic covering 613. A first interface 611 receives both the first end 602 of the optical fiber 601 and the first end 604 of the electrical link 610. A second interface 612 receives both the second end 603 of the optical fiber 601 and the second end 605 of the electrical link 610.

In operation, the source controller 641 of the digital source device 640 produces data signals (e.g. pixel, audio, and/or control data signals). The data signals are transmitted to the TMDS transmitter 642, which converts the data signals into the TMDS data signal format. The TMDS transmitter 642 transmits the TMDS data signals to the serializer 606. The serializer 606 receives the TMDS signals and interleaves the signals for sequential transmission to the TOSA 607. The TOSA 607 receives the interleaved signals, converts the electrical signals transmitted from the serializer 607 into optical signals, and transmits the optical signals to the optical fiber 601 coupled to a first interface 602 of the digital source device 640.

The optical signals are received by the ROSA 608 coupled to the second interface 612 of the optical cable 600. The ROSA 608 includes an optical receiver that converts the optical signals back to electrical signals and transmits the electrical signals to the deserializer 509. The deserializer 509 deserializes the electrical signal into TMDS signals, and transmits the separate TMDS signals to the TMDS receiver 622. The TMDS receiver 622 converts the TMDS signals into video and/or audio data signals, and the video and/or audio data signals are output to the display and/or audio controller 621 of the digital sink device 620 along with control signals. Thus, the optical fiber 601 can provide data signal transmission from the digital source device 640 to the digital sink device 620 in a similar fashion to that described above with reference to FIG. 3.

Figure 2:
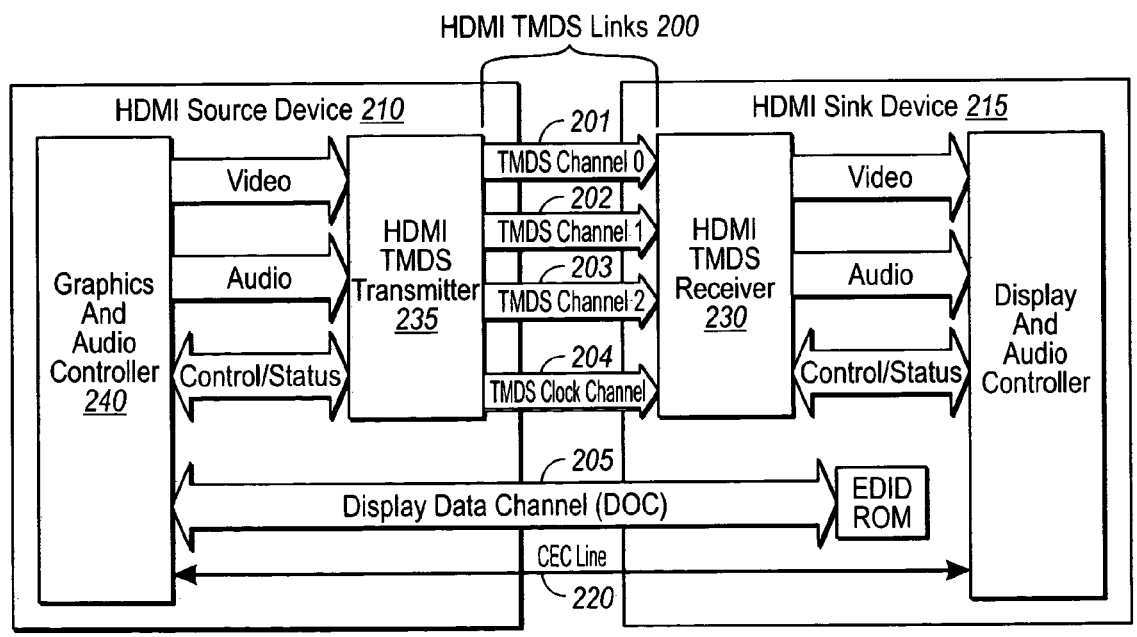
FIG. 2 illustrates the typical flow of data from the graphics and audio controller of a HDMI source to the display and audio controller of a HDMI sink.

Referring still to FIG. 6, the electrical link 610 electrically couples the sink controller 621 of the digital sink device 620 to the source controller 641 of the digital source device 640. The electrical link 610 can provide electrical communication for a return signal from the digital sink device 620 to the digital source device 640 in a direction opposite to that provided by the optical fiber 601. Bidirectional communication allows for both the digital source device 640 and the digital sink device 620 to send and receive data to each other. The electrical link 610 can also be used to provide electrical communication in the same direction, or both directions. For example, the electrical link 610 (or a plurality of electrical links) can provide electrical communication for transmission of the Display Data Channel and/or the CEC signals in a HDMI embodiment (e.g. see FIG. 2). The Display Data Channel and/or the CEC signals can also be transmitted along with the TMDS signals.

According to this example embodiment, the optical fiber 601 can be used to transfer the TMDS signals from the digital source device 640 to the digital sink device in a direction where a larger bandwidth and larger transfer rate may be most advantageous. The electrical cable 610 can be used to transfer a data signal in either direction in applications where the larger bandwidth and larger transfer rate may not be required. For example, the electrical cable 610 may be used to send information that identifies the manufacturer and model number of the sink device 620 or the source device 640. This information may then be displayed on a screen by the digital source device 640 or the digital sink device 620. A relatively low bandwidth is needed to transmit information identifying the manufacturer and model number. Other low bandwidth signals can include various handshaking, configuration, updating of firmware of software, or control signals.

The electrical link 610 can comprise more than one electrical wire or cable for transferring data between the sink device 620 and the source device 640. For example, the electrical link 610 can be an unshielded twisted pair, ribbon cable, coax cable, etc. One advantage of combining optical with electronic communication in this manner is that the optical channel will not suffer any EMI interference from the electrical cable. Therefore, the optical channel may be packaged closer to the electronic channels than would otherwise be available for two electronic channels.

According to other example embodiments, wavelength-division multiplexing and time-division multiplexing may be implemented for communication across any of the optical fibers discussed herein in a similar fashion to that described above with reference to FIG. 4 and FIG. 5.

The electrical link 610 may transmit analog data signals between the sink device 620 and the source device 640 and TDM may be used to transmit data over the electrical link 610 by interlacing packets of data in each direction with a header and fields or other means for identifying the source, type, and/or purpose of the data in the packet payload.

Figure 7:
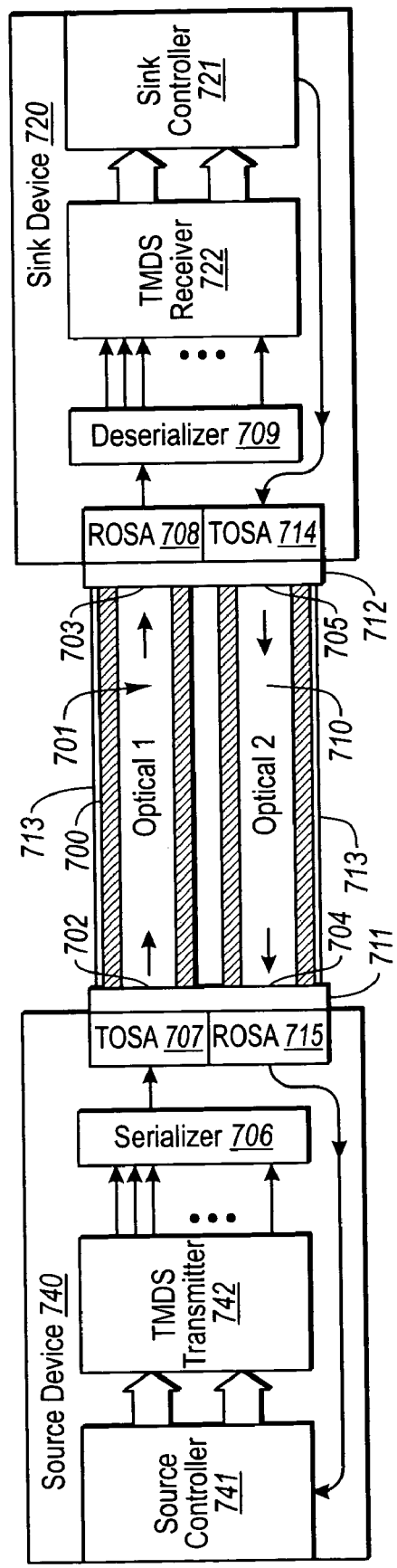
FIG. 7 illustrates digital electronic devices according to an example embodiment of the present invention.

Referring now to FIG. 7, a digital source device 740 and a digital sink device 720 are shown in bidirectional communication across a bidirectional optical cable 700 according to an example embodiment of the present invention. The digital optical cable 700 comprises a first optical fiber 701 having a first end 702 and a second end 703, and a second optical fiber 710 having a first end 704 and a second end 705. Both the first optical fiber 701 and the second optical fiber 710 can be encased by a single plastic covering 713. A first interface 711 receives both the first end 702 of the first optical fiber 701 and the first end 704 of the second optical fiber 710. A second interface 712 receives both the second end 703 of the first optical fiber 701 and the second end 705 of the second optical fiber 710.

As shown in FIG. 7, the first interface 704 is coupled to the digital source device 740, and the second interface 712 is coupled to the digital sink device 720. The first optical fiber 701 can be used for transmission of the TMDS signals from the source device 740 to the sink device 720. The first optical fiber 701 can provide data signal transmission from the source device 740 to the sink device 720 in a similar fashion to that described above with reference to FIG. 3.

For example, in operation, the source controller 741 of the digital source device 740 produces data signals (e.g. pixel, audio, and/or control data signals). The data signals are transmitted to the TMDS transmitter 742, which converts the data signals into the TMDS data signal format. The TMDS transmitter 742 transmits the TMDS data signals to the serializer 706. The serializer 706 receives the TMDS signals and interleaves the signals for sequential transmission to the TOSA 707. The TOSA 707 receives the interleaved signals, converts the electrical signals transmitted from the serializer 707 into optical signals, and transmits the optical signals to a first end 702 of the optical fiber 701 received by a first interface 711 of the digital source device 740.

The optical signals are received by the ROSA 708 from a second end 703 of the optical fiber 701 received by a second interface 712. The ROSA 708 includes an optical receiver that converts the optical signals back to electrical signals and transmits the electrical signals to the deserializer 709. The deserializer 709 deserializes the electrical signal into TMDS signals, and transmits the separate TMDS signals to the TMDS receiver 722. The TMDS receiver 722 converts the TMDS signals into video and/or audio data signals, and the video and/or audio data signals are output to the display and/or audio controller 721 of the digital sink device 720 along with control signals.

The second optical fiber 710 can be used for a return data transmission in the direction from the sink device 720 to the source device 740. The sink device 720 can include a TOSA 714 that transmits an optical return signal from a sink controller 721 to a source controller 741. The TOSA 714 converts the electrical return signal into an optical return signal and transmits the optical return signal onto the second end 705 of the second optical fiber 710. The source device 740 includes a ROSA 715 that receives the optical return signal from the first end 704 of the second optical fiber 710 and converts the optical return signal into an electrical return signal. The ROSA 715 transmits the electrical return signal to the source controller 741 of the source device 740.

According to this example embodiment, the first optical fiber 701 can be used to transfer the TMDS signals from the source device 740 to the sink device 720, and the second optical fiber 710 can be used to transfer data from the sink device 720 to the source device 740. This embodiment may be particularly advantageous where a larger bandwidth and/or larger transfer rate is desirable in both directions. It should be appreciated that the direction of data transfer can be reversed or bidirectional.

According to an example embodiment, the TOSA 707 of the first interface 704 (or any TOSA described herein) can include a VCSEL for transmission of the optical serialized data signal onto the first optical fiber 701; and the TOSA 714 of the second interface 712 can include an LED for transmission of the return optical signal onto the second optical fiber 710. An LED may be used for the TOSA 714 of the second interface 712 when lower bandwidths are acceptable in that direction or where using an LED is more cost efficient than using a VCSEL. Thus, a VCSEL may be used for higher bandwidth paths, such as those sending video and/or audio data, while an LED may be used for lower bandwidth paths, such as those sending manufacturer, configuration, model and/or control signals.

According to other example embodiments, WDM and TDM can be implemented in either direction of the embodiment illustrated in FIG. 7 for communication across the optical fibers (e.g. as described above with reference to FIG. 4 and FIG. 5).

Figure 8A:
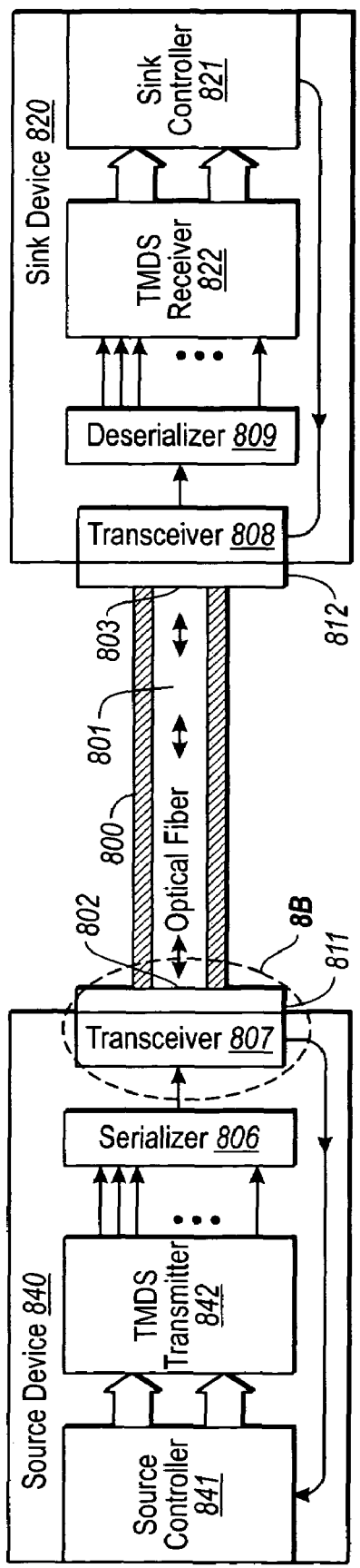
FIG. 8A illustrates digital electronic devices according to an example embodiment of the present invention.

Referring now to FIG. 8A, a digital source device 840 and a digital sink device 820 are coupled for bidirectional optical communication by a bidirectional optical cable 800 according to an example embodiment of the present invention. The optical cable 800 can comprise a single optical fiber 801 having a first end 802 and a second end 803. A first interface 811 of the digital source device 840 receives the first end 802 of the optical fiber 801 and a second interface 812 of the digital sink device 820 receives the second end 803 of the optical fiber 801.

According to the embodiment shown in FIG. 8A, the same optical fiber 801 is used for bidirectional data transmission from the source device 840 to the sink device 820 and from the sink device 820 to the source device 840. The source device 840 and the sink device 820 can both include a fiber optic transceiver 807 for bidirectional optical communication. Several different transceiver embodiments can be implemented as discussed below in FIGS. 8B-14B.

Figure 8B:
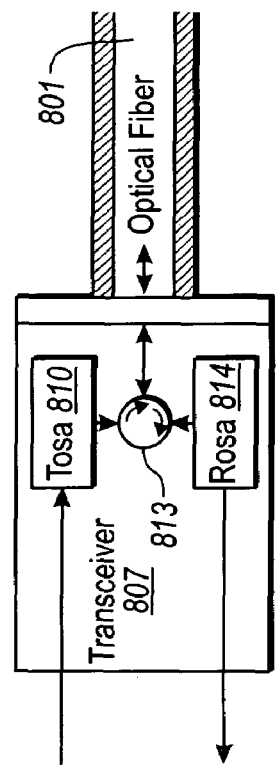
FIG. 8B illustrates a bidirectional optical transceiver for use in digital electronic devices according to an example embodiment of the present invention.

FIG. 8B depicts an example embodiment of a transceiver 807. The transceiver 807 can include a TOSA 810 for sending optical signals, and a ROSA 814 for receiving optical signals. The TOSA 810 can include an optical transmitter (e.g. a laser or LED) that receives an electrical data signal, converts the electrical data signal into an optical data signal, and transmits the optical data signal onto the optical fiber 801. The ROSA 814 can include an optical receiver that receives an optical data signal from the optical fiber 801 and converts the signal to an electrical data signal. The transceiver 807 can further include an optical circulator 813 that separates transmitted and received data signals. While a particular embodiment of a transceiver 807 is shown and described, other transceiver embodiments including other optical subassemblies and components can be used to send and receive optical signals over the digital optical cable, for example as discussed below with reference to FIGS. 9-14B.

According to an example embodiment, the TOSA 810 of the transceiver 807 of the digital source device 840 can include a VCSEL for transmission of the optical serialized data signal onto the optical fiber 801; and the TOSA 810 of the transceiver 808 of the digital sink device 820 can include a LED for transmission of the return optical signal onto the optical fiber 801 in the opposite direction at a shifted wavelength form that transmitted in the opposite direction.

The optical cable 800 can couple the sink controller 821 of the sink device 820 to the source controller 841 of the source device 840 for bidirectional transmission of control, identification and/or configuration data. The same optical fiber 801 can also be used to transfer the TMDS signals from the digital source device 840 to the digital sink device 820. The same optical fiber 801 can also be used to transfer return data in the opposite direction at a different wavelength. In an HDMI embodiment, the same optical fiber 801 can be used to transfer the DDC and CEC signals. This embodiment may be particularly advantageous where a single optical fiber is desirable.

According to other example embodiments, WDM and TDM may be implemented in either direction for communication across the optical fiber 801. However, in some instances the highest speed communication may only be necessary in one direction (i.e. from the source device 840 to the sink device 820), but not necessarily in the opposite return direction. In this case, TDM across the single optical fiber 801 may not be as advantageous because of asymmetric rates of data transfer, whereas WDM may be more advantageous.

Using an optical fiber to transmit the TMDS signals and/or other signals between a digital sink device and a digital source device can reduce the EMI fields, which is one factor that may limit the length of conventional cables using copper cables to transmit the TMDS signals. This may eliminate the need for additional hardware to extend transmission distances, such as a repeater.

Fiber optic data transmission is also accurate and efficient over relatively long distances that may be longer than that achieved using metal based cables to transmit TMDS signals. Fiber optic data transmission over longer distances may also be less susceptible to interference than transmission using metal based cables. Fiber optic cables may also be thinner and lighter than metal cables. Fiber optic cables may also eliminate the need for digital to analog and analog to digital conversion. Several embodiments may also allow for increased length of digital video, and/or audio cables, improved performance remote placement of digital video and/or audio components, reduced hardware, and less transmission errors over that available using conventional cables using copper links.

Fiber optic technology is also characterized by high bandwidth and reliable, high-speed data transmission. While a typical copper based cable bandwidth may range from 22.5 Mpps to 165 Mpps and higher, reliable fiber optic communication over a single optical fiber may be able to achieve speeds many times faster than the speed of a copper based digital transmission cable. As a result, digital optical cables configured in accordance with embodiments of the present invention may facilitate increased bandwidth and data transfer rates over copper based digital cables. The increased bandwidth and data transfer rates in turn may facilitate the use of higher resolution, higher quality, more audio channels, or larger displays having more display pixels.

Embodiments of the present invention can comprise a TOSA including an optical package (e.g. a TO-Can package) having an optical transmitter (e.g. a VCSEL), a monitor photodiode, and a laser driver within the optical package for transmitting the optical signal to the optical fiber. The optical transmitter and monitor photodiode, may be discrete components, or may be made from a common epitaxial design. Some aspects of embodiments of an optical package are further described in U.S. Provisional Patent Application No. 60/605,781 entitled "Laser With Digital Electronic Interface" which has been incorporated by reference herein. According to an embodiment, the laser driver can be a modulation laser driver for providing a modulation current source to the laser. A bias current source may be supplied to the laser from a source external to the TOSA, such as the 5 VDC power source connection located on a standard DVI or HDMI cable. The TO-Can package can be incorporated as part of a transceiver or where a TOSA is referenced in the embodiments described above.

Embodiments of the present invention implementing bidirectional optical communication can also comprise various transceiver designs. Referring again to FIGS. 8A and 8B, the transceivers 807 and/or 808 can comprise various different subcomponents, assemblies, and configurations for sending and receiving optical signals across the single optical fiber. For example, referring to FIG. 9 a bidirectional optical transceiver assembly 910 is illustrated according to an example embodiment of the present invention. The bidirectional optical transceiver assembly 910 can be used in the source device 840 or the digital sink device 820 of FIG. 8A in place of the transceiver embodiment shown in FIG. 8B for bidirectional optical communication across the optical fiber 801.

Figure 9:
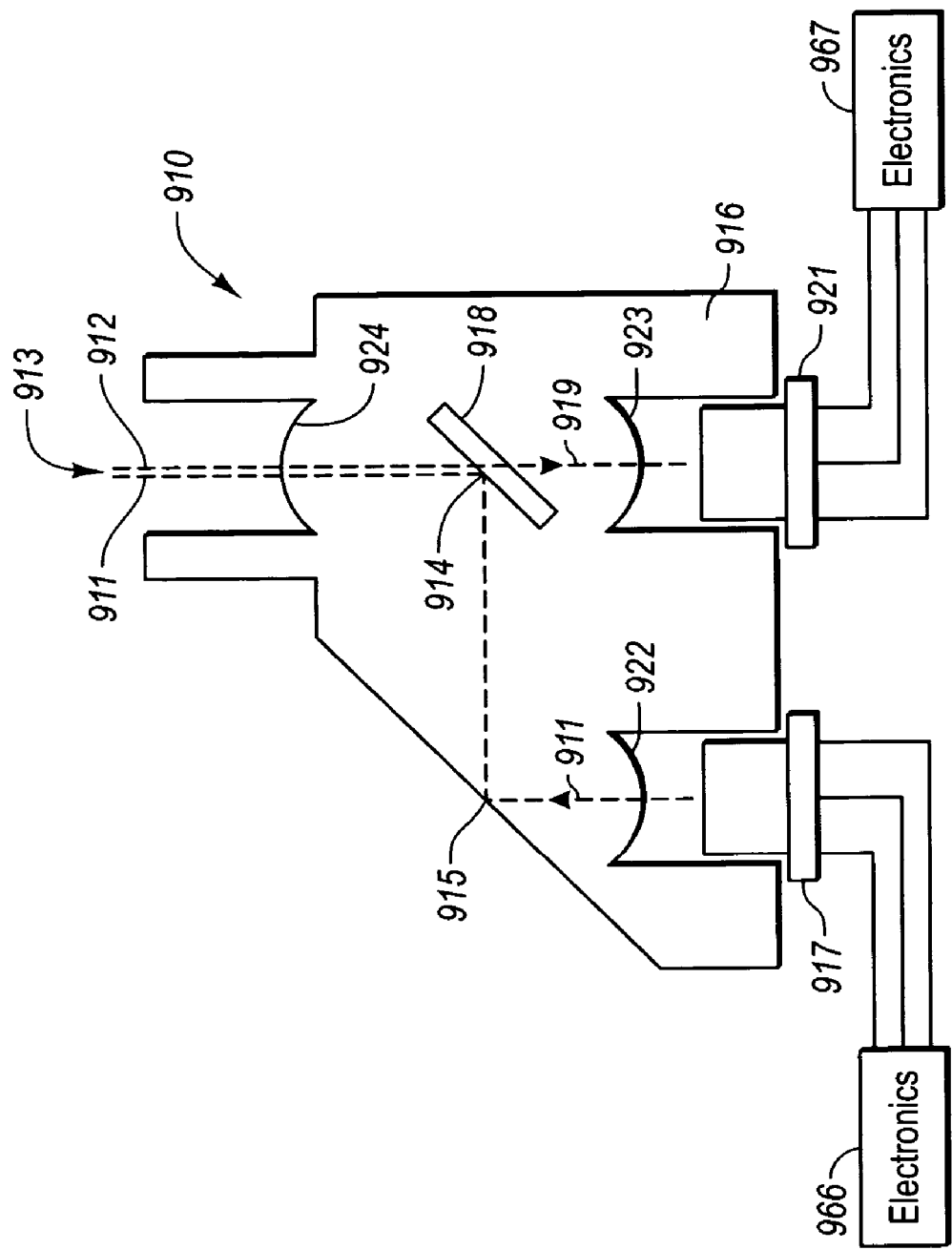
FIG. 9 illustrates a bidirectional optical transceiver assembly for use in a digital electronic device according to an example embodiment of the present invention.

FIG. 9 is a basic diagram of a bidirectional multiband optical assembly 910. Light 911 of a first wavelength may be emitted by light source 917, which may be reflected at points 915 and 914 and exit optical port 913. Light source 917 may be a VCSEL outputting light 911 that may be modulated in one form or another with communication signals or the like. These functions may be accomplished with an electronics module 966 that is connected to source 917. Source 917 may be another kind of device as appropriate for an application of the assembly. Light 911 may have other wavelengths, besides the first wavelength, which may be filtered out by a filter or mirror. Points 915 and 914 are where light is reflected and may be located at mirrors that are discrete or integrated parts of structure 916, such as an internal reflecting surface in the structure, or a reflective filter. Point 914 may be where filter 918 is reflective of a particular wavelength. Filter 918 may allow light 919 to pass through it to optical port 913. Light 912 may enter optical port 913 and go through a wavelength filter 918. Filter 918 may be a dichroic filter that reflects one or more wavelengths and transmits others. Filter 918 may be designed to pass light 919 of a second wavelength. All other wavelengths of light 912 are not transmitted through filter 918. Light 919 of the second wavelength may be detected by a detector 921 and converted into electrical signals. Light 919 may be modulated. Detector 921 along with an electronics module 967 may demodulate such light. Detector 921 may be a photo detector or another kind of device as appropriate for an application of the assembly. Light signals may be sent and received by device 910 simultaneously. On the other hand, components 917 and 921 may both be detectors or sources and receive or send, respectively, various signals simultaneously on different wavelengths of light, or on the same wavelength. Device 917 and/or 921 may both a source and a detector.

Source 917 and detector 921 may be enclosed within a standard TO can (e.g., TO-5 or TO-18) as optical components. These components may electronically and packaging-wise have interfaces to standard PCBs for small for factor pluggable (SFP) modules. These components may have other forms of packaging. Alternatively, source 917 and detector 921 may be integral parts of structure 916. Lenses 922 and 923 for light source 917 and detector 921, respectively, may be molded plastic parts. The lenses 922 and 923 also may be parts integrated into structure 916 or be molded as part of the structure. Lenses 922 and 923 may instead be part of TO can components 917 and 921, or be situated on or monolithically be a part of the laser and detector chips. Lens 924 at optical port 913 may focus incoming light to a mirror, filter or detector in structure 916. It may also focus outgoing light to a light waveguide, such as a fiber, at optical port 913. Lens 924 may have the same structural characteristics as those of lenses 922 and 923. Lenses 922, 923 and 924 may also be used to collimate light.

Structure 916 may be a molded plastic part, made from a material such as Ultem®, or it may be an injection molded metal part or other metal housing. Structure 916 also may be made from a composite material. The TO-can optical components 917 and 921 may be attached to the plastic or metal structure 916 using an epoxy or laser welding, respectively. These components are alignment tolerant. Metal rings may be attached to a plastic structure 916 for laser welding metal components to it. Filter 918 or mirror may be placed in a molded indent formed within plastic or metal structure 916 and glued in place or it may be inserted and held in place by compression. A molded groove in structure 916 may provide appropriate alignment of filter 918. Alternatively, structure 916 may be composed of two pieces glued together, one or both of which may have reflectors deposited on their surfaces. The bidirectional multiband optical assembly 910 can be used in the source device 840 or the digital sink device 820 of FIG. 8A in place of the transceiver embodiment shown in FIG. 8B for bidirectional optical communication across the optical fiber 801.

Figure 10:
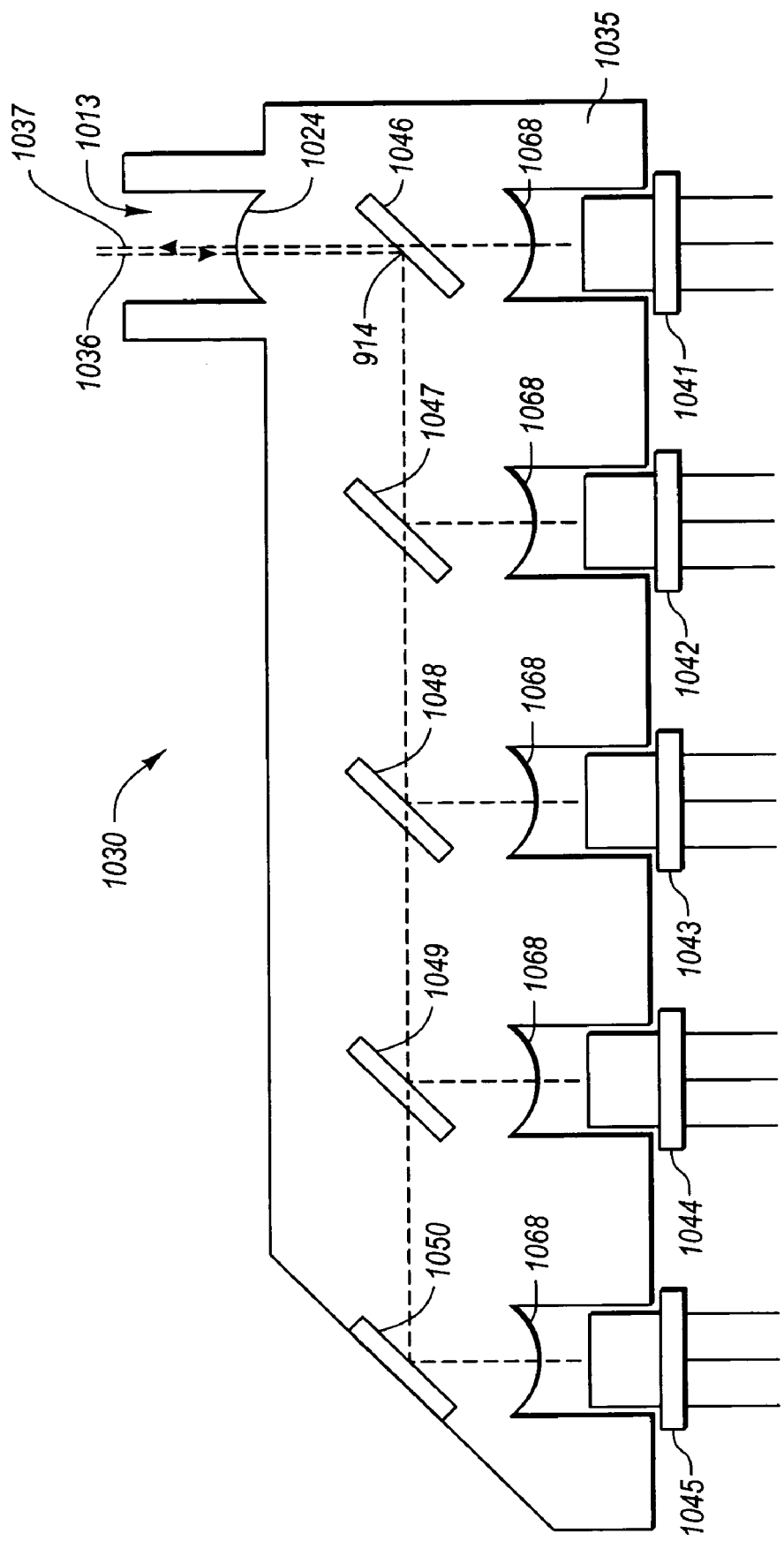
FIG. 10 illustrates a bidirectional optical transceiver assembly for use in a digital electronic device according to an example embodiment of the present invention.

FIG. 10 shows a bidirectional optical transceiver device 1030 having a multitude of optical components, such as detectors or sources, or a mix of detectors and sources. The number of optical components is arbitrary, and may be determined by the application of device 1030 or the standard of a digital optical cable (e.g. the number of communication channels in a DVI or HDMI standard). Device 1030 reveals five optical components 1041, 1042, 1043, 1044 and 1045, as an illustrative example of a structure 1035. Light 1036 may arrive through port 1013 and light 1037 may exit port 1013. Light 1036 received may have a multitude of wavelengths (e.g. each representing a TMDS signal), each wavelength having communication signals different from those of other wavelengths. Similarly, light 1037 sent out may have a multitude of wavelengths (e.g. representing TMDS, or other, signals), each wavelength having communication signals different from those of other wavelengths. Light 1036 and light 1037 may be conveyed to and from optical components 1041, 1042, 1043, 1044 and 1045 by an optical mechanism 1038. Mechanism 1038 may be a light waveguide, an optical fiber, a series of mirrors, or other items to accomplish the conveyance of light 1036 and 1037 to and from the optical components. Or mechanism 1038 might not be utilized. Lenses 1024 and 1068 may be used to focus or collimate light as appropriate. The lenses may be an integral part of structure 1035. Light 1036 and light 1037 to or from optical components 1041, 1042, 1043, 1044 and 1045 may go through filters, for example, filters 1046, 1047, 1048, 1049 and 1050, respectively. In other words, if each optical component has a wavelength different from the other optical components, there may be a filter of that wavelength associated with the respective component. For instance, optical component 1041 may send or receive light signals of a first wavelength or bandwidth (e.g. a first TMDS signal); optical component 1042 may send or receive light signals of a second wavelength or bandwidth (e.g. a second TMDS signal); optical component 1043 may send or receive light signals of a third wavelength or bandwidth (e.g. a third TMDS signal); optical component 1044 may send or receive light signals of a fourth wavelength or bandwidth (e.g. a fourth TMDS signal); and optical component 1045 may send or receive light signals of a fifth wavelength or bandwidth (e.g. a fifth TMDS signal, a DDC signal, or a CEC signal). Similarly, filter 1046 may transmit or pass light signals only of a first wavelength or bandwidth; filter 1047 may transmit light only of a second wavelength or bandwidth; filter 1047 may transmit light only of a second wavelength or bandwidth; filter 1048 may transmit light of only a third wavelength or bandwidth; filter 1049 may transmit light of only a fourth wavelength or bandwidth; and filter 1050 may transmit light of only a fifth wavelength or bandwidth. All of optical components 1041, 1042, 1043, 1044 and 1045 may send light signals 1037 and/or receive light signals 1036 at the same time.

Filters 1046, 1047, 1048, 1049 and 1050 may be replaced with, for example, dichroic reflectors or other wavelength or bandwidth discriminating mechanisms. With such replacements, the optics may be adjusted for conveying light signals 1036 and 1037 to and from optical components 1041, 1042, 1043, 1044 and 1045.

Figure 1:
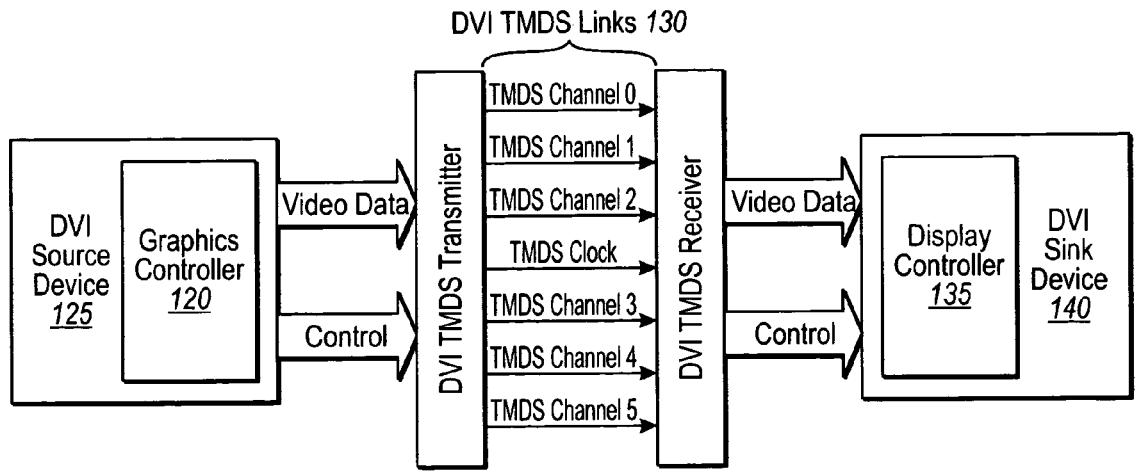
FIG. 1 illustrates the typical flow of data from the graphics controller of a DVI source to the display controller of a DVI sink device.

Structure 1035 may be made from molded plastic, for example, Ultem®, metal, composite materials or other suitable materials. Structure 1035 may have similar features as those of structures 1010 and 1020 in FIGS. 1 and 2. The bidirectional optical transceiver device 1030 can be used in the source device 840 or the digital sink device 820 of FIG. 8A in place of the transceiver embodiment shown in FIG. 8B for bidirectional optical communication across the optical fiber 801.

Figure 11:
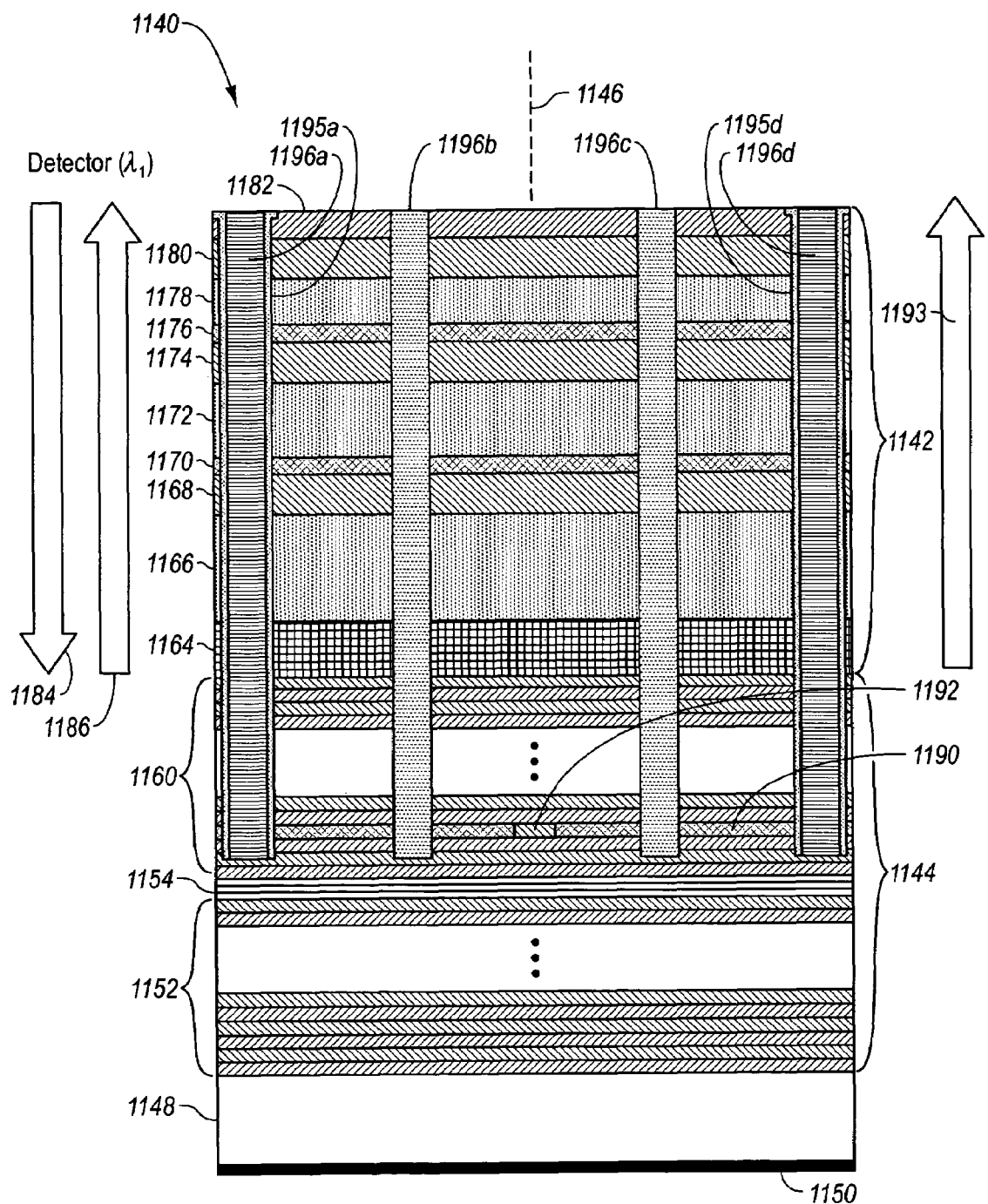
FIG. 11 illustrates a bidirectional optical transceiver assembly for use in a digital electronic device according to an example embodiment of the present invention.

Referring now to FIG. 11, a cross-sectional side view of an illustrative optical transceiver is shown in accordance with an embodiment of the present invention. The illustrative optical transceiver is generally shown at 1140, and includes an optical detector 1142 situated above an optical transmitter 1144, both aligned along a common optical axis 1146. The optical detector 1142 preferably absorbs a first wavelength and/or range of wavelengths, while passing a second wavelength and/or range of wavelengths. The optical transmitter 1144 preferably transmits a second wavelength and/or range of wavelengths, which passes through the optical detector 1142 and out the top of the optical transceiver 1140. In the illustrative embodiment, both the incoming light beam and the outgoing light beam pass through the top side of the optical transceiver 1140.

Although any suitable optical transmitter 1144, fabricated from any of a number of semiconductor materials may be used, the optical transmitter 1144 shown in FIG. 11 is a planar, current-guided GaAs/AlGaAs top emitting Vertical Cavity Surface Emitting Laser (VSCEL). The illustrative VCSEL 1144 is formed on an n-doped gallium arsenide (GaAs) substrate 1148, which has an n-contact layer 1150 provided on the bottom surface. An n-type mirror stack 1152 is formed on the substrate 1148. The n-type mirror stack 1152 is preferably a distributed Bragg reflector (DBR), which includes periodic layers of doped AlGaAs with alternating higher and lower aluminum fractions. An active region 1154 is shown atop the n-type mirror stack 1152. The active region 1154 preferably has a number of quantum wells, but may be any suitable active region as desired. Also, the active region 1154 may include a bottom confinement layer and a top confinement layer. A p-type mirror stack 1160 is provided on top of the active region 1154 to complete the VCSEL structure. The p-type mirror stack 1160 is preferably a distributed Bragg reflector (DBR), which includes periodic layers of doped AlGaAs with alternating higher and lower aluminum fractions. The n-type mirror stack 1152, active region 1154 and p-type mirror stack 1160 are preferably configured to produce an outgoing light beam that has the second wavelength and/or range of wavelengths.

An optical detector 1142 is provided atop the VCSEL 1144. The illustrative optical detector 1142 includes three series connected photodiodes, which are also connected in series with the VCSEL 1144. A heavily p-doped buffer layer 1164 may be provided on top of the top mirror 1160, as shown.

To form the first photodiode, a p-doped layer 1166 is provided on the heavily p-doped buffer layer 1164, followed by an n-doped layer 1168. Both the p-doped layer 1166 and the n-doped layer 1168 may be AlGaAs. The Al fraction is preferably adjusted to tune the bandgap of the layers to achieve a desired absorption cutoff wavelength, which in the illustrative embodiment, is below the emission wavelength of the VCSEL 1144.

A reverse biased tunnel junction 1170 is coupled to the first photodiode. The tunnel junction 1170 includes two highly but oppositely doped adjacent layers to create an abrupt junction that produces a narrow depletion, allowing substantial tunneling current even at relative low reverse bias voltages. In the illustrative embodiment, the bottom layer of the tunnel junction 1170 is n-type and the top layer is p-type. The n-type bottom layer makes good electrical contact with the n-doped layer 1168 of the first photodiode, and the p-type top layer makes good electrical contact with a p-doped layer 1172 of the second photodiode, which includes P-doped layer 1172 and n doped layer 1174.

Once the tunnel junction 1170 is formed, the p-doped layer 1172 is provided, followed by an n-doped layer 1174 to form the second photodiode. The tunnel junction 1170 makes the series connection between the first photodiode and the second photodiode. Like the first photodiode, both the p-doped layer 1172 and the n-doped layer 1174 may be Al GaAs. The Al fraction is preferably adjusted to tune the bandgap of the layers to achieve the same cutoff wavelength as the first photodiode, but this is not required in all embodiments. Yet another tunnel junction 1176 is then formed, followed by a p-doped layer 1178 and an n-doped layer 1180 to form a third photodiode.

During use, an incoming light beam 1184 having a first wavelength and/or range of wavelengths is provided to the top of the optical transceiver 1140. Each of the first, second and third photodiodes is preferably tuned to absorb at least a portion of the first wavelength and/or range of wavelengths of the incoming light beam 1184. The p-type mirror stack 1160 of the VCSEL is preferably at least partially reflective at the first wavelength and/or range of wavelengths. Thus, at least part of the light that is not absorbed by the first, second and third photodiodes will be reflected back through the photodiodes, as shown at 1186. The thickness of the first, second and third photodiodes is preferably adjusted so that each photodiode absorbs approximately the same energy from the incoming light beams 1184 and 1186. In one embodiment, the thickness of the first, second and third photodiodes is about 0.30, 0.27, and 0.23 microns, respectively, for an absorption wavelength of 808 microns. An upper contact layer 1182 may be provided to make electrical contact to the n-type layer 1180 of the third photodiode. One or more quarter wave oxide or nitride layers (not shown) may also be provided on top of the structure 1140 to reduce reflection and to help protect the optical transceiver 1140.

In one illustrative embodiment, and to help define the current aperture of the VCSEL 1144, one or more trenches 1196a-1196d may be etched through the first, second and third photodiodes, and in some embodiments, into the top p-type mirror stack 1160 of the VCSEL 1144. This may be accomplished with a Reactive Ion Etch (RIE), but any suitable patterning method may be used. To facilitate selective lateral oxidization, one or more of the periodic layers of the top p-type DBR mirror stack 1160 of the VCSEL 1144 is provided with a higher Al concentration relative to the other periodic layers. When exposed to an oxidizing environment through the one or more trenches 1196a-1196d, layer 1190 is selectively oxidized in a lateral direction to form a current aperture 1192 for the VCSEL 1144. The extent of the lateral oxidation can be controlled by controlling the exposure time of layer 1190 to the oxidizing environment. As can be seen, the exposure time is preferably controlled so that a desired current aperture 1192 remains. In one embodiment, the current aperture 1192 of the VCSEL 1144 has a diameter of about 5-10 microns.

In the illustrative embodiment, the lateral dimension of the first, second and third photodiodes is greater than the lateral dimensions of the aperture 1192 of the VCSEL 1144. In the illustrative embodiment, the lateral dimension of the first-, second- and third-photodiodes may be on the order of 100-200 microns, while the lateral dimension of the optical cavity of the VCSEL 1144 may be on the order of 5-10 microns. When an optical fiber having a diameter of, for example, 100 microns is positioned above the optical transceiver 1140, the lateral dimension of the first-, second- and third-photodiodes may be sufficiently wide to absorb much of the incoming light beam without the need for a lens or other light concentrating element. Further, the alignment of the optical fiber to the first, second and third photodiodes may not be difficult or critical. Likewise, and because the aperture 1192 of the VCSEL 1144 is relatively small relative to the diameter of the optical fiber, much of an outgoing light beam 1193 produced by the VCSEL 1144 will be captured by the optical fiber without the need for a lens or other light concentrating element. As such, an efficient and cost effective optical transceiver 1140 may be provided.

In some embodiments, the depth of the trenches 1196a-1196d may only be about 1-2 microns wide. A metal layer may then be deposited on top of the structure 1140 to fill in at least some of the trenches, such as trenches 1196a and 1196d, to make an electrical connection to the top mirror 1160 of the VCSEL 1144. To prevent the metal layer from making electrical contact with the various intermediate layers of the optical detector 1142, those trenches that are filled with the metal layer may first be lined with a dielectric layer as shown at 1195a and 1195d. As further described below, these electrical connections may be useful when it is desirable to provide the entire electrical potential produced by the series connected first, second and third photodiodes to other devices or structures. The optical transceiver 1140 can be used in the source device 840 or the digital sink device 820 of FIG. 8A in place of the transceiver embodiment shown in FIG. 8B for bidirectional optical communication across the optical fiber 801.

Figure 12:
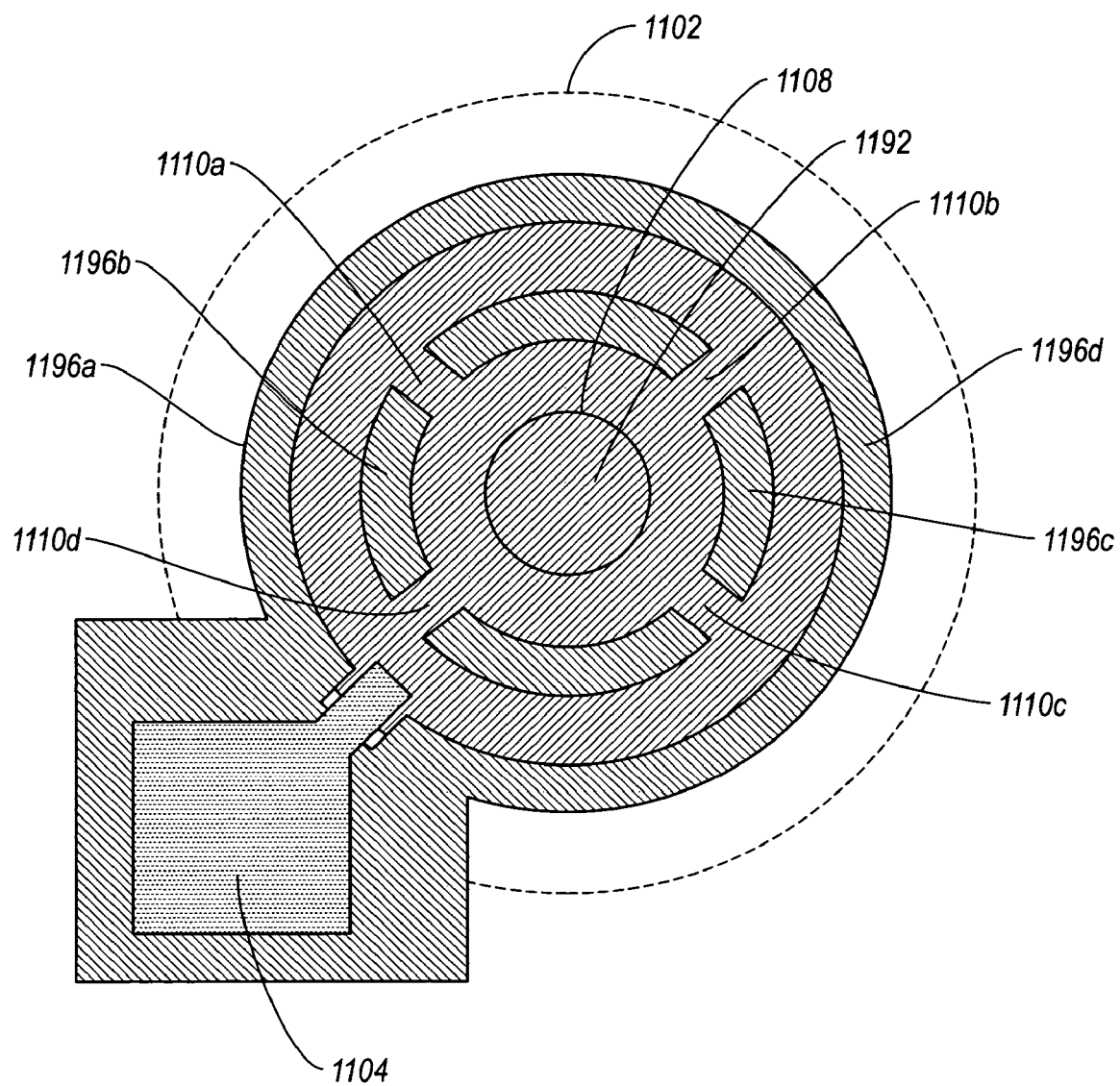
FIG. 12 illustrates a bidirectional optical transceiver assembly for use in a digital electronic device according to an example embodiment of the present invention.

FIG. 12 is a top view of the illustrative optical transceiver of FIG. 11. FIG. 12 shows the top of the optical detector 1142 including trenches 1196a-1196d, as well as the lateral extent of the lateral oxidization of layer 1190 of VCSEL 1144. Also shown is a metal contact used to make electrical contact to the top of the optical detector 1142.

The outer boundary of the illustrative optical detector 1142 is defined by the outer trench, which is collectively shown at 1196a and 1196d. The outer trench helps electrically isolate the optical detector 1142 from other optical detectors or devices formed on the same substrate. The outer trench also helps keep the total capacitance of the optical detector 1142 down. The illustrative outer trench 1196a and 1196d is circular in shape, but other shapes may be used. The inner trench, collectively 1196b 1196c, is also circular in shape, and is spaced inward from the outer trench. The inner trench may be filled with an oxide or other dielectric, if desired.

In the illustrative embodiment of FIG. 12, the inner trench 1196b and 1196c include one or more bridges, such as bridges 1110a-1110d. Bridges 1110a-1110d provide an electrical connection between the portion of the optical detector 1142 that is situated inside of the inner trench 1196b and 1196c and the portion of the optical detector 1140 that is situated between the inner trench 1196b and 1196c and the outer trench 1196a and 1196d. When so provided, the metal contact 1104 may only extend over and make an electrical connection to the portion of the optical detector 1142 situated between the inner trench 1196b and 1196c and the outer trench 1196a and 1196d. If the bridges 1110a-110d are not provided, a metal trace may be provided across the inner trench 1196b and 1196c to make an electrical connection to the portion of the optical detector 1142 situated inside of the inner trench 1196b and 1196c, if desired. As can be seen, the optical detector 1142 may cover a relatively larger area than the aperture 1192 of the VCSEL 1144. When the outer trench 1196a and 1196d and inner trench 1196b and 1196c are exposed to an oxidizing environment, layer 1190 of VCSEL 1144 (see FIG. 11) is selectively oxidized in a lateral direction to form a current or optical aperture 1192. The extent of the lateral oxidization is shown by dashed lines 1102 and 1108. In the embodiment shown, layer 1190 of VCSEL 1144 is oxidized outward from the outer trench to dashed line 1102 and inward from the outer trench toward the inner trench. Likewise, layer 1190 of VCSEL 1144 is oxidized outward from the inner trench toward the outer trench, and inward from the inner trench to dashed line 1108. Dashed line 1108 outlines the current aperture 1192 of the VCSEL 1144. In one embodiment, the current aperture 1192 has a diameter of about 5-10 microns, which produces a lower power VCSEL transmitter.

In some embodiments, the inner and outer trenches may be filled with an oxide or other isolation material. In other embodiments, a metal layer (not shown in FIG. 12) may be deposited down into at least part of the some of the trenches, such as the inner and/or outer trenches 1196a-1196d, to make an electrical connection to the top mirror 1160 of the VCSEL 1144. When a metal layer is provided, a dielectric layer may first be provided to help prevent the metal layer from making electrical contact with the various intermediate layers of the optical detector 1142. As further described below, this electrical connection may be useful when it is desirable to make the entire electrical potential produced by the series connected first, second and third photodiodes available to other devices or structures. In a similar manner, and in some embodiments, appropriate trenches and metal contacts can be provided such that all three electrical contacts are separately available on the top surface, enabling, for example, flip-chip bonding to either opaque or transparent substrates.

Any of the embodiments illustrated herein can include monolithically formed laser diodes and photodiodes. In one such embodiment, the laser diodes and photodiodes are connected through tunnel junctions such that a single power supply may be used to power the laser diodes and photodiodes. Appropriate contacts are formed to allow access to the various junctions of the laser diodes, tunnel junctions, and photodiodes.

Figure 13:
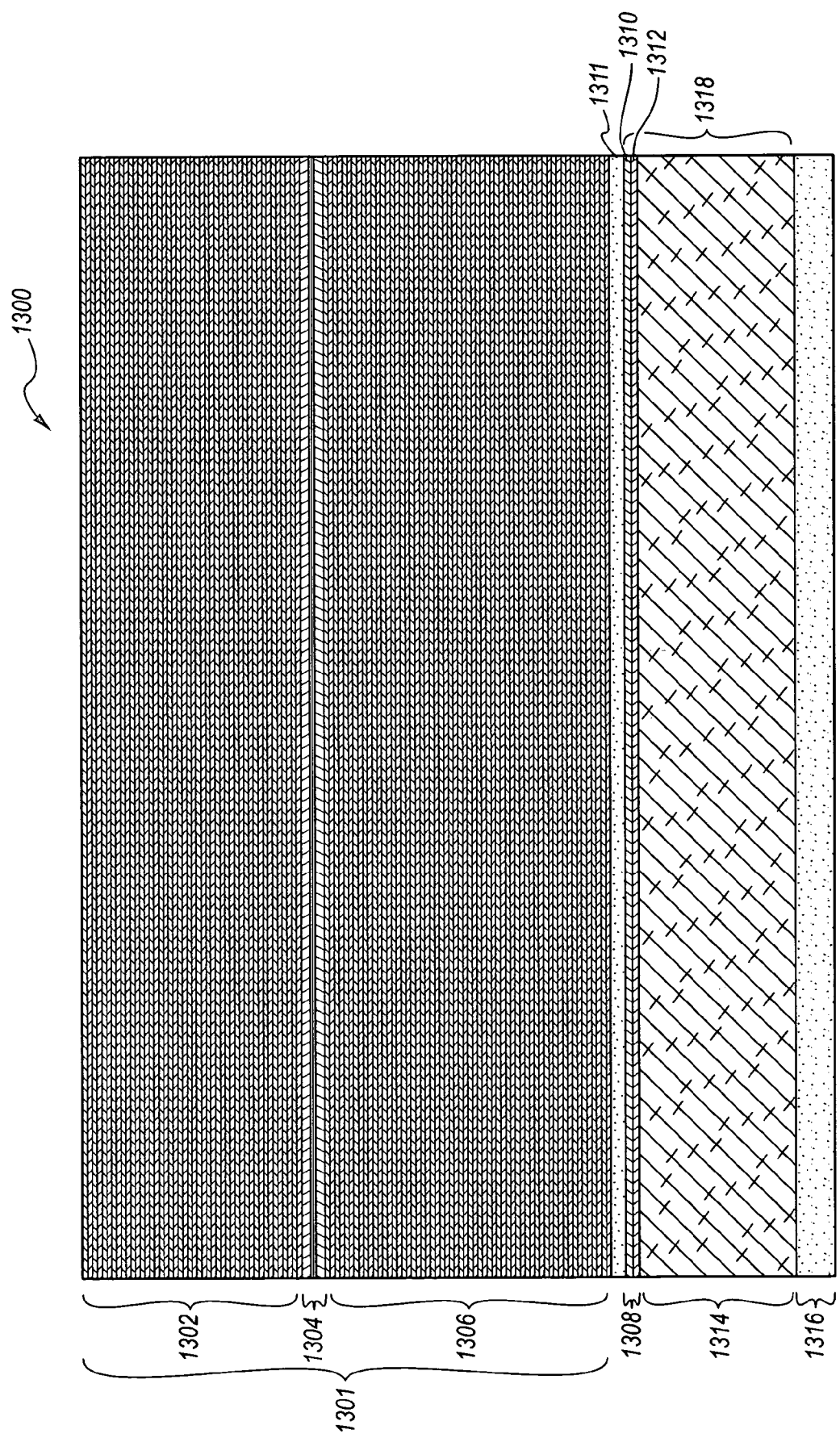
FIG. 13 illustrates a bidirectional optical transceiver including a light emitting device with an integrated monitor photodiode for use in a digital electronic device according to an example embodiment of the present invention.

Referring now to FIG. 13, an example of an optoelectronic device including an epitaxial structure 1300 that includes layers formed on a wafer substrate is shown. In one embodiment, the structure 1300 is grown using a GaAs wafer. However, other III-V (three-five) semiconductor combinations may also be used. FIG. 13 shows a VCSEL 1301. The VCSEL 1301 in the example shown includes a top mirror 1302, an active region 1304, and a bottom mirror 1306. A PN junction exists in the active region 1304.

A spacer layer 1311 is formed below the bottom mirror 1306. The spacer layer 1311 is preferably about $5\lambda/4$ or $7\lambda/4$ where $\lambda$ is the wavelength of light that the VCSEL 1301 is designed to emit. The spacer layer 1311 may be any odd integral multiple of the wavelength (i.e., $\lambda(1+n)/4$ where n is an integer) that is thick enough to account for non-uniformities that may occur in various layers of the epitaxial structure 1300. The spacer layer 1311 must be sufficiently thick such that when etching is done to the spacer layer 1311 the deepest non-uniformities do not go all the way through the spacer layer 1311 and the shallowest potions reach the spacer layer 1311. The goal, therefore is to expose the spacer layer 1311 without going all the way through the spacer layer 1311 at any point. Subsequent processing uses a selective etchant such as dilute hydrofluoric acid to uniformly expose the layer underlying the spacer.

The epitaxial structure 1300 further includes a tunnel junction 1308, formed on and electrically connected to the VCSEL 1301. The tunnel junction 1308 includes a heavily doped n+ layer 1310 and a heavily doped p+ layer 1312.

The epitaxial structure 1300 further includes a photodiode, formed on and electrically connected to the tunnel junction 1308, that includes a second PN junction that is comprised of the heavily doped p+ type layer 1312 of the tunnel junction 1308 and a lightly doped photodiode n type layer 1314. An additional p type layer (not shown) that is not as heavily doped may also be fabricated between the p+ type layer 1312 and the photodiode n type layer 1314. In one embodiment, the epitaxial structure 1300 is constructed on an n type substrate 1316. Although the substrate 1316 is shown in FIG. 13 as a thin layer, the substrate is actually in one embodiment of the invention in the hundreds of microns whereas the epitaxial structure including the photodiode, the tunnel junction 1308, and the laser diode 1301 is about 10 microns. The epitaxial structure 1300 is generally grown using a metal organic chemical vapor phase deposition (MOCVD) process.

The top mirror 1302 is a distributed Bragg reflector (DBR) that generally comprises a number of alternating layers with high and low indexes of refraction. This creates a mirror with high reflectivity, around 99.5%. In the example shown, the top mirror is constructed of p type materials such as carbon doped aluminum gallium arsenide (AlGaAs), where the fraction of Al can vary from 0% to 100%. The top mirror 1302 includes about 20 mirror periods where each period includes a high index of refraction layer and a low index of refraction layer.

The active region 1304 includes a number of quantum wells for stimulating the emission of laser energy. In the embodiment shown, active region 1304 is less than 1 micron.

Below the active region is a bottom mirror 1306. The bottom mirror is comprised of about 30 to 35 doped n type mirror periods. Silicon is one example of a dopant that may be used in the bottom mirrors.

The tunnel junction 1308, as mentioned previously, includes a heavily doped n+ layer 1310 and a heavily doped p+ layer 1312. To accomplish the heavy doping, it may be desirable to create a super lattice structure. For example, instead of only GaAs layers, it may be desirable to include both layers of GaAs and InGaAs (e.g. several alternating layers) to tailor the bandgap and doping properties to improve the tunnel junction 1308. It is also desirable that the tunnel junction 1308 be somewhat transparent so as to allow optical energy to pass through to the photodiode layer 1314. This may be done in one embodiment by increasing doping on the heavily doped n+ layer 1310 so as to increase transparency through the so-called Burstein shift.

It would advantageous to balance the thickness of the heavily doped p+ layer 1312 such that appropriate conduction exists through the tunnel junction 1308 while maintaining appropriate transparency. Thus, in one embodiment of the invention, the heavily doped p+ layer 1312 is about 50 to 100 nanometers and preferably at least $3 \times 10^{19}$ of p type material (e.g., when used in an 850 nm laser). The heavily doped n+ layer may be nearly any practicable thickness without imposing an optical penalty.

Below the tunnel junction 1308 is a photodiode 1318. The photodiode 1318 should be constructed so as to have an appropriate responsivity to incoming light. Thus, in one embodiment of the invention, the photodiode 1318 includes a lightly doped n layer 1314 that is approximately three microns or less when the VCSEL 1301 is designed to emit an 850 nm wavelength. One embodiment of the invention includes a lightly doped n layer 1314 that is about 1.5 microns. Notably, the thickness of the lightly doped n layer 1314 can be used to tailor the responsivity and speed of the photodiode. The optical transceiver can be used in the source device 840 or the digital sink device 820 of FIG. 8A in place of the transceiver embodiment shown in FIG. 8B for bidirectional optical communication across the optical fiber 801.

Figure 14A:
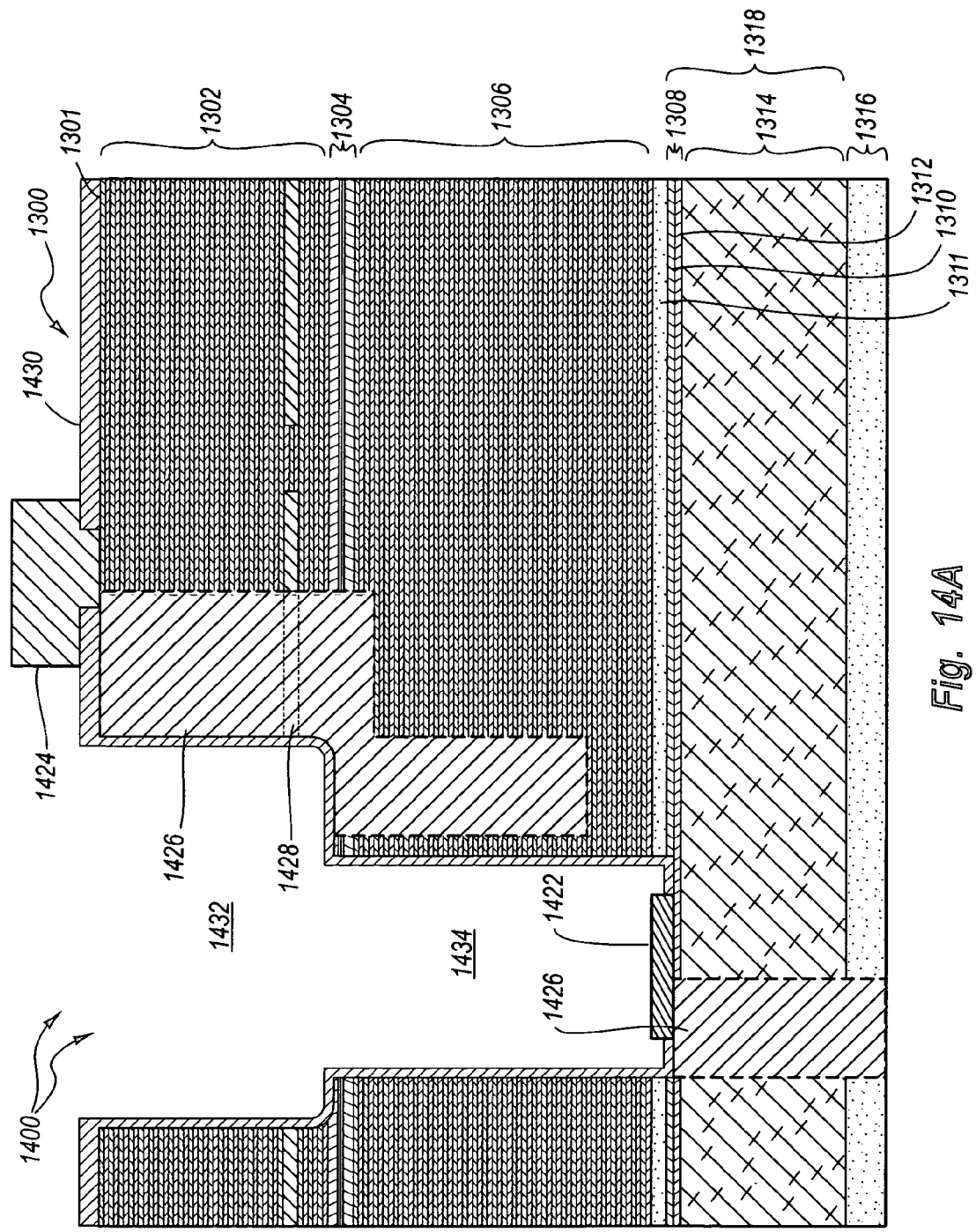
FIGS. 14A and 14B illustrate a bidirectional optical transceiver including a light emitting device with an integrated monitor photodiode for use in a digital electronic device according to an example embodiment of the present invention.

Referring now FIG. 14A, an embodiment is shown where contacts and oxide layers are formed through a photolithographic process. The formation of contacts allows appropriate biasing to be applied to, and signals to be read from the VCSEL 1301 and photodiode 1318. The lithographic process includes a series of acts where photoresist is applied to the epitaxial layers 1300. The photoresist is then exposed lithographically to various patterns. Lithographic exposure allows a pattern of photoresist to remain on the epitaxial layers 1300 while the remainder of the photoresist may be washed from the epitaxial layers 1300.

The patterns of photoresist that remain on the epitaxial layers 1300 block ions from being implanted in the epitaxial layers 1300, metal from being deposited on the epitaxial layers 1300, and etching solutions from etching portions of the epitaxial layers 1300. Thus, using appropriate photolithographic processes a monolithic structure 1400 that includes a VCSEL 1301, a tunnel junction 1308 and a photodiode 1318 may be constructed with appropriate contacts and with appropriate isolation from other devices on a wafer being fabricated simultaneously.

In the example shown in FIG. 14A, a tunnel junction contact 1422 is formed such that it connects to the heavily doped p layer 1312. A VCSEL contact 1424 is formed such that it connects to the top mirror 1302 of the VCSEL 1301. Another contact may be formed on the bottom of the substrate 1316 to provide the appropriate contact to the photodiode 1318. Isolation barriers 1426 are formed to isolate the VCSEL 1301 and the photodiode 1318 from other devices being formed on the substrate 1316. An aperture 1428 is oxidized into the top mirror 1302. The aperture 1428 is used primarily to direct current flow through the VCSEL 1301.

More specifically, the optoelectronic device 1400 is fabricated from an epitaxial structure 1300. The epitaxial structure 1300 has a dielectric such as silicon dioxide or silicon nitride grown on it to form a portion of the dielectric layer 1430. A shallow trench mask is used to remove portions of the oxide using an etching process. An etch process is used to form the shallow trench 1432 in the VCSEL 1301. The aperture 1428 can then be oxidized into the VCSEL 1301.

A deep trench mask can then be used to etch the deep trench 1434. An etch can be used to etch down to a thick AlAs spacer 1311. This spacer may be AlAs or another AlGaAs composition, so long as the fraction of aluminum is substantially greater than that in the underlying layer. A stop etch may be used to etch through the AlAs spacer 1311 to the n+ layer 1310. Another etch can be used to etch through the n+ layer 1310 to the p+ layer 1312. At this point, an additional oxide may be grown that forms additional portions of the dielectric layer 1430. Portions of the dielectric layer 1430 are removed followed by deposition of metal to form contacts 1422, 1424 on the optoelectronic device 1400.

Figure 14B:
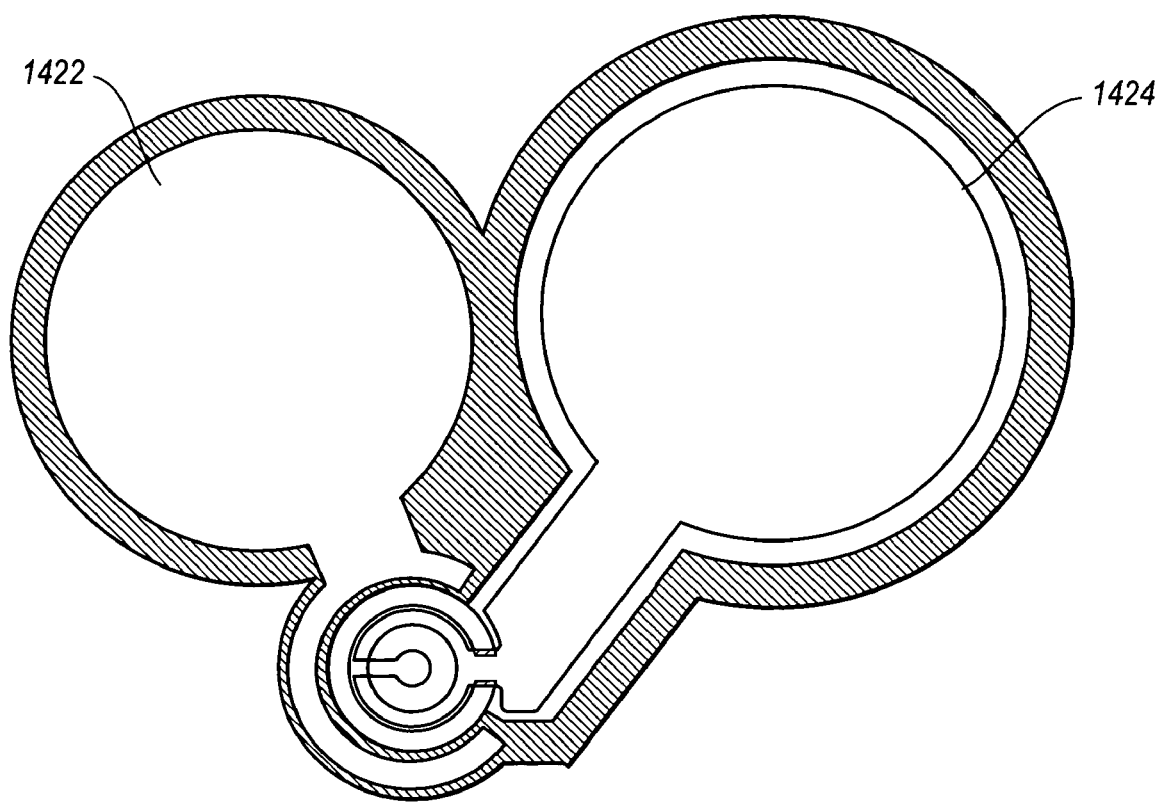

A top view of the optoelectronic device structure and contacts is shown in FIG. 14B. FIG. 14B illustrates the placement of the tunnel junction contact 1422 and the VCSEL contact 1424. While a single tunnel junction contact 1422 is shown, in other embodiments, an additional tunnel junction contact may be formed opposite the tunnel junction contact 1422 to provide for additional wire bonding options when packaging the optoelectronic device structure.

While the present invention has been described being implemented in devices using the DVI and HDMI standards for digital video and/or audio data transfer, the same teachings may be applied to other digital video and/or audio data transfer standards. For example, it would be apparent to one of ordinary skill in the art in view of the present disclosure how to apply the teachings of the present invention to other video data standards such as VESA, LDVS, DFP, as well as others. Such embodiments are included within the scope of the present invention.

In addition, the digital video data communication need not be conducted between the specific digital components named in this disclosure. The communication may be between any digital video and/or audio components, or consumer electronic components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A digital source device comprising:
    a source controller configured to generate control and digital video signals;
    a transition minimized differential signaling (TMDS) transmitter coupled to the source controller for receiving control and digital video signals from the source controller and for converting the control and digital video signals into electric TMDS signals;
    an interface configured to receive a first end of an optical fiber; and
    an optical transmitter for receiving the electronic TMDS signals, converting the electric TMDS signals into at least one optical signal, and for transmitting the at least one optical signal to the first end of the optical fiber, wherein the TMDS transmitter and optical transmitter are disposed in the digital source device along with the source controller and interface, wherein the digital source device is configured for bidirectional optical communication to both transmit the at least one optical signal to the first end of the optical fiber and also configured to receive at least one optical signal from the first end of the optical fiber, wherein the optical transmitter comprises means for transmitting and receiving optical signals, wherein the transmitting and receiving means comprises an optoelectronic device comprising:
        a laser diode comprising a first PN junction with a first p layer and a first n layer, the laser diode including an active region configured to generate light;
        a first tunnel junction coupled monolithically to the laser diode, the tunnel junction comprising a heavily doped n+ layer and a heavily doped p+ layer; and
        a first photodiode coupled monolithically to the first tunnel junction, the first tunnel junction comprising a second PN junction.

2. A digital source device according to claim 1, wherein the TMDS transmitter further receives a digital audio signal from the source controller and converts the digital audio signal into at least one of the electric TMDS signals.

3. A digital source device according to claim 1, further comprising:
    circuitry configured to serialize the electrical TMDS signals received from the TDMS transmitter into an electrical serialized signal, wherein the optical transmitter receives the electrical serialized signal and converts the electrical serialized TMDS signal into the optical signal.

4. A digital source device according to claim 1, wherein the digital source device further comprises:
    a wavelength division multiplexer (WDM) and/or a time division multiplexer (TDM).

5. A digital source device according to claim 1, wherein the digital source device is further configured to receive a first end of an electrical cable or a first end of a second optical fiber for receiving a return signal.

6. A digital source device according to claim 1, wherein the transmitting and receiving means comprises an optoelectronic device for detecting an incoming light beam along a light beam axis and for transmitting an outgoing light beam along the light beam axis, the optoelectronic device comprising:
    an optical detector positioned along the light beam axis for receiving the incoming light beam and for detecting a first wavelength and/or range of wavelengths; and
    the optical transmitter positioned along the light beam axis for transmitting the outgoing light beam, wherein the outgoing light beam includes a second wavelength and/or or range of wavelengths.

7. A digital source device according to claim 1, wherein the transmitting and receiving means comprises a bidirectional optical device comprising:
    an optical port;
    a wavelength splitter proximate to the optical port;
    a light source proximate to the wavelength splitter; and
    a detector proximate to the wavelength splitter; and wherein:
the wavelength splitter passes light having a first wavelength from the light source to the optical port; and
the wavelength splitter reflects light having a second wavelength from the optical port to the detector.

8. A digital sink device comprising:
a sink controller configured to receive control and digital video signals and cause digital video to be displayed by the digital sink device;
an interface configured to receive an end of an optical fiber;
an optical receiver for receiving an optical signal from the first end of the optical fiber and for converting the optical signal into at least one transition minimized differential signaling (TMDS) signal; and
a TMDS receiver coupled to the sink controller for receiving the TMDS signals from the optical receiver, converting the TMDS signals into control and digital video signals, and for transmitting the control and digital video signals to the sink controller, wherein the sink controller, interface, optical receiver, and TMDS receiver are disposed within the digital sink device, wherein the digital sink device is configured for bidirectional optical communication to both transmit the at least one optical signal to the first end of the optical fiber and also configured to receive at least one optical signal from the first end of the optical fiber, wherein the optical receiver comprises means for transmitting and receiving optical signals, wherein the transmitting and receiving means comprises an optoelectronic device comprising:
a vertical cavity surface emitting laser (VCSEL) diode comprising a first PN junction with a first p layer and a first n layer;
a first tunnel junction coupled monolithically to the VCSEL, the tunnel junction comprising a heavily doped n+ layer and a heavily doped p+ layer; and
a first photodiode coupled monolithically to the first tunnel junction, the first tunnel junction comprising a second PN junction.

9. A digital sink device according to claim 8, wherein the TMDS receiver also converts the TMDS signals into at least one digital audio signal and transmits the at least one digital audio signal to the sink controller.

10. A digital sink device according to claim 8, wherein the digital sink device further comprises:
a wavelength division demultiplexer (WDD) and/or a time division demultiplexer (TDD).

11. A digital sink device according to claim 8, wherein the digital sink device further comprises a light emitting diode (LED) for transmitting a second optical signal onto the optical fiber in a direction opposite to that in which the digital sink device receives the received optical signal.

12. A digital sink device according to claim 8, wherein the digital sink device further comprises:
a VCSEL for transmitting a second optical signal onto the optical fiber in a direction opposite to that in which the digital sink device receives the optical signal;
a monitor optical receiver for monitoring the output of the VCSEL;
a modulation laser driver configured to modulate a bias drive current supplied to the VCSEL; and
a TO-Can package encasing the VCSEL, the monitor optical receiver, and the modulation laser driver.

13. A digital sink device according to claim 8, wherein the interface also receives an electrical cable or a second optical fiber for transmitting a return signal from the digital sink device to a digital source device.

14. A digital sink device according to claim 8, wherein the transmitting and receiving means comprises an optoelectronic device for detecting an incoming light beam along a light beam axis and for transmitting an outgoing light beam along the light beam axis, the optoelectronic device comprising:
an optical detector positioned along the light beam axis for receiving the incoming light beam and for detecting a first wavelength and/or range of wavelengths; and
the optical transmitter positioned along the light beam axis for transmitting the outgoing light beam, wherein the outgoing light beam includes a second wavelength and/or range of wavelengths.

15. A digital sink device according to claim 8, wherein the transmitting and receiving means comprises a bidirectional optical device comprising:
an optical port;
a wavelength splitter proximate to the optical port;
a light source proximate to the wavelength splitter; and
a detector proximate to the wavelength splitter; and
wherein:
the wavelength splitter passes light having a first wavelength from the light source to the optical port; and
the wavelength splitter reflects light having a second wavelength from the optical port to the detector.

* * * * *